(12) United States Patent
Arioka et al.

(10) Patent No.: US 6,699,557 B2
(45) Date of Patent: Mar. 2, 2004

(54) OPTICAL RECORDING MEDIUM AND OPTICAL RECORDING METHOD

(75) Inventors: Hiroyuki Arioka, Tokyo (JP); Syuji Tsukamoto, Tokyo (JP); Takashi Horai, Tokyo (JP); Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 10/107,039

(22) Filed: Mar. 28, 2002

(65) Prior Publication Data

US 2002/0192423 A1 Dec. 19, 2002

Related U.S. Application Data

(60) Provisional application No. 60/279,745, filed on Mar. 30, 2001, provisional application No. 60/279,753, filed on Mar. 30, 2001, provisional application No. 60/279,754, filed on Mar. 30, 2001, and provisional application No. 60/279,761, filed on Mar. 30, 2001.

(51) Int. Cl.$^7$ .............................. B32B 3/02; G11B 7/24
(52) U.S. Cl. .................... 428/64.4; 428/64.2; 428/64.8; 428/66.6; 369/275.4; 430/270.14
(58) Field of Search ............................. 428/64.2, 64.4, 428/66.6, 64.8; 369/275.4; 430/270.14

(56) References Cited

U.S. PATENT DOCUMENTS

| | | | | |
|---|---|---|---|---|
| 5,406,546 A | * | 4/1995 | Uchiyama et al. | ........ 369/275.4 |
| 6,269,062 B1 | * | 7/2001 | Minemura et al. | ........ 369/47.53 |
| 6,529,467 B2 | * | 3/2003 | Miyamoto et al. | .......... 369/116 |

| | | | |
|---|---|---|---|
| 2001/0036143 A1 | | 11/2001 | Ohono et al. |

FOREIGN PATENT DOCUMENTS

| | | |
|---|---|---|
| JP | 61-211835 | 9/1986 |
| JP | 62-164590 | 7/1987 |
| JP | 1-154328 | 6/1989 |
| JP | 1-182846 | 7/1989 |
| JP | 2-278535 | 11/1990 |
| JP | 2-504196 | 11/1990 |
| JP | 3-228227 | 10/1991 |
| JP | 4-044642 | 2/1992 |
| JP | 5-205276 | 8/1993 |
| JP | 8-077599 | 3/1996 |
| JP | 2634827 | 4/1997 |
| JP | 10-027396 | 1/1998 |

\* cited by examiner

*Primary Examiner*—Deborah Jones
*Assistant Examiner*—G. A. Blackwell-Rudasill
(74) *Attorney, Agent, or Firm*—Oliff & Berridge, PLC

(57) ABSTRACT

An optical recording medium (10) is adapted such that information is recorded by forming recording marks on a recording layer (12) that covers grooves (16) of an optical transparent substrate (14). In the recording layer (16), contiguously defined along a feed direction S of irradiation are virtual recording cells (40) which have a given unit length in the feed direction S of irradiation along the groove 16 and a given unit width in the direction orthogonal thereto. In addition, the groove width W is set so that $0.20\times(\lambda/NA) < W < 0.50\times(\lambda/NA)$, where $\lambda$ is the wavelength of a laser beam to be irradiated with and NA is the numerical aperture of the objective lens for the laser beam in a irradiation optical system. The irradiation time is set in five stages or more to radiate the laser beam, thereby making it possible to record information in multi-levels.

25 Claims, 14 Drawing Sheets

OPTICAL RECORDING MEDIUM AND OPTICAL RECORDING METHOD

This application claims the benefit of Provisional Application Nos. 60/279,745, 60/279,753, 60/279,754, and 60/279,761 filed on Mar. 30, 2001.

DETAILED DESCRIPTION OF THE INVENTION

1. Field of the Invention

The present invention relates to an optical recording medium and an optical recording method for irradiating the optical recording medium with a laser beam by switching in multi-stages at least one of the duration of time and power of the laser beam in response to the data to be recorded in order to form recording marks of multiple types on the recording layer and thereby record information in multi-levels.

2. Description of the Prior Art

A number of studies have been made on a method for recording multiple pieces of data on each of signals having the same length by switching the depth of a read signal (the degree of modulation of a reflected signal) in multi-stages in contrast to a method for recording data on a conventional optical recording medium by changing the length of a read signal (the length of the modulated portion of a reflected signal) in multi-stages.

This optical recording method, in comparison with a case of recording binary data merely by the presence or absence of pits, makes it possible to record multiple pieces of data in the depth direction. This allows more signals to be assigned to a given length and thus the linear record density to be improved. As a method for switching the depth of a read signal in multi-stages, the power of a laser beam is in general switched in multi-stages to thereby form some recording marks of different types. As its recording medium, suggested currently are those that use holograph or have a multi-layered recording layer.

Incidentally, it is called the multi-level recording to record multiple types of record data different in degree of modulation of reflected signal from each other.

On the other hand, these optical methods for multi-level recording had a problem of providing signals that were degraded in quality at the time of reading as the power of a laser beam for use in recording increased, that is, as a reflected signal to be formed was increased in depth. The reason for this has not been made clear until now, however, the inventor predicts that this is conceivably caused by an increase in area of a recording mark (recording mark area) resulting from an increase in the laser power. For example, suppose that a conventional method was used to shorten recording marks to provide a recording medium with an amount of information recorded at a high density, in which the power of a laser beam was switched in multi-stages to perform multi-level recording. In this case, the quality of signals was significantly degraded, resulting in making no use of the merit of the multi-level recording. That is, to employ the multi-level recording, the recording marks had to be spaced widely apart from each other so that data could be positively detected to some extent even when the quality of signals were degraded. For this reason, the conventional method had a problem that recording marks were provided at a high density with difficulty, thus resulting in mutually contradictory circumstances.

The concept of a conventional optical recording method for performing multi-level recording by switching the power of a laser beam in stages is based on the premise that the length of a recording mark is greater than the diameter of a converging beam (beam waist) available at the time of recording. That is, the concept aims to realize multi-level recording by modulating the optical reflectivity of the recording mark itself in multi-stages and then directly reading the reflectively.

In general, the diameter of a converging beam is expressed by $K\lambda/NA$ (where K is a constant, $\lambda$ is the wavelength of the laser, and NA is the numerical aperture of the lens). In general, $\lambda=780$ nm and NA=0.45 are employed in pickups for use with CDs with the converging beam being about 1.6 $\mu$m in diameter. In this case, with the recording mark being around 1.6 $\mu$m in length, the aforementioned problem of signal degradation become apparent, making it difficult to perform multi-level recording in five stages or more. According to a close study made by the inventor, this was presumably in part because of the fact that the prior art was based on the precondition that the length of the recording mark was greater than the diameter of the converging beam (beam waist) available at the time of recording, then modulated the optical reflectivity of the recording mark itself in multi-stages, and directly read the reflectivity to thereby realize multi-level recording.

The problems mentioned above are conceivably resulted from every factor, intertwined in a complicated manner, such as the power setting of the laser beam or the characteristics of the recording medium. However, as far as known to the inventor, the causes of the problem have not yet been made clear until now. Thus, the real picture is that the multi-level recording of a high density as well as its recording method have not yet been accomplished.

SUMMARY OF THE INVENTION

The present invention has been developed in view of the aforementioned problems. It is therefore the object of the present invention to suggest a new multi-level recording method by setting the characteristics of a recording medium to a predetermined condition, thereby accomplishing the multi-level recording of a high density.

The inventor has made intensive studies on optical recording media, and found a method for assuming virtual recording cells of a given size on the recording layer, where recording marks of different sizes were formed, to modulate the reflectivity of the entire virtual recording cells in multi-stages for multi-stage recording. The inventor confirmed that the method made it possible to perform multi-level recording of high densities in five stages or more on an optical recording medium. That is, the invention described below makes it possible to achieve the aforementioned object.

(1) An optical recording medium in which on an optical transparent substrate having predetermined grooves, a recording layer is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that $0.20\times(\lambda/NA) < W < 0.50\times(\lambda/NA)$, where $\lambda$ (nm) is the wavelength of the laser beam and NA is the numerical aperture of the objective lens for the laser beam in a irradiation optical system; at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

(2) The optical recording medium according to (1) in the foregoing, characterized in that the groove width W is set so that $0.25 \times (\lambda/NA) < W < 0.45 \times (\lambda/NA)$.

(3) The optical recording medium according to (1) or (2) in the foregoing, characterized in that a plurality of the grooves are formed generally parallel to each other, and the pitch P between the grooves adjacent to each other is set so that $0.65 \times (\lambda/NA) < P$, more preferably $0.7 \times (\lambda/NA) < P < 1.2 \times (\lambda/NA)$.

(4) The optical recording medium according to (1), (2), or (3) in the foregoing, characterized in that the recording layer is adapted to contain an organic dye.

(5) The optical recording medium according to any one of (1) to (4) in the foregoing, characterized in that the recording layer is adapted to contain a cyanine base dye.

(6) An optical recording medium in which on an optical transparent substrate having predetermined grooves, a recording layer mainly including phthalocyanine dye is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that $0.25 \times (\lambda/NA) < W < 0.55 \times (\lambda/NA)$, where $\lambda$ (nm) is the wavelength of the laser beam and NA is the numerical aperture of the objective lens for the laser beam in a irradiation optical system; at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

(7) The optical recording medium according to (6), wherein the groove width W is set so that $0.30 \times (\lambda/NA) < W < 0.50 \times (\lambda/NA)$.

(8) The optical recording medium according to (6) or (7), wherein a plurality of the grooves are formed generally parallel to each other, and the pitch P between the grooves adjacent to each other is set so that $0.65 \times (\lambda/NA) < P$, more preferably $0.7 \times (\lambda/NA) < P < 1.2 \times (\lambda/NA)$.

(9) An optical recording medium with an optical transparent substrate having predetermined grooves and a recording layer formed at least to cover the grooves, the recording layer being irradiated with a laser beam to form recording marks and record information at least on the recording layer, the optical recording medium wherein on the recording layer, virtual recording cells are contiguously defined along a feed direction of the laser irradiation for performing recording and reading operations on the groove, the virtual recording cell having a given unit length in the feed direction and a given unit width in a direction perpendicular thereto, a minimum film thickness of the recording layer with respect to a bottom surface of the groove is set to be smaller than a depth of the groove on the optical transparent substrate, and at least either an irradiation time or an irradiation power is set in five stages or more to irradiate the virtual recording cell with the laser beam, thereby allowing for forming recording marks having different sizes of five types or more on the virtual recording cell, and an entire optical reflectivity of the virtual recording cell is modulated based on an area ratio of the recording mark to the virtual recording cell, thereby allowing for recording information in multi-levels.

(10) The optical recording medium according to (9), Wherein the minimum film thickness M of the recording layer with respect to the bottom surface of the groove is set in terms of the groove depth F on the optical transparent substrate, so that $0.2 \times F < M < 1.0 \times F$.

(11) The optical recording medium according to (9) or (10), wherein the minimum thickness M of the recording layer with respect to the bottom surface of the groove is set in terms of the groove depth F on the optical transparent substrate, so that $0.3 \times F < M < 0.8 \times F$.

(12) The optical recording medium according to (9), (10), or (11), wherein the minimum thickness M of the recording layer with respect to the bottom surface of the groove is set in terms of the groove depth F on the optical transparent substrate, so that $0.4 \times F < M < 0.6 \times F$.

(13) The optical recording medium according to any one of (9) to (12), wherein the recording layer contains an organic dye.

(14) The optical recording medium according to (13), wherein the organic dye contained in the recording layer comprises a cyanine base dye.

(15) An optical recording medium with a recording layer formed on an optical transparent substrate and irradiated with a laser beam to form recording marks and record information on the recording layer, wherein within a recording mark formation region on the optical recording medium, a plurality of virtual recording cells are contiguously defined in a direction of movement relative to the laser beam, the virtual recording cell having a predetermined unit length and a predetermined unit width in a direction perpendicular thereto, a characteristic of the virtual recording cell is set so that $(X-Y)/X$ is 0.3 or more, preferably 0.4 or more, where $X(\%)$ is an initial reflectivity of the virtual recording cell without being irradiated with the laser beam and $Y(\%)$ is a minimum reflectivity limit for a maximum recording mark formed by being irradiated with the laser beam, and at least either an irradiation time or an irradiation power of the laser beam is modulated in five stages or more to irradiate the virtual recording cell with the laser beam, thereby allowing for multi-level recording.

(16) The optical recording medium according to (15), wherein when the recording marks are formed by switching at least either the irradiation time or the irradiation power of the laser beam in five stages or more to perform multi-level recording, the characteristic of the virtual recording cell is set so that a variation in reflectivity of all recording mark formation regions at each stage falls within 5%, preferably within 3%.

(17) The optical recording medium according to (1) or (2), wherein the characteristic of the virtual recording cell is set so that $(X-Y)/X \leq 0.9$.

(18) An optical recording method for an optical recording medium with a recording layer formed on an optical transparent substrate and irradiated with a laser beam to form recording marks and record information on the recording layer, wherein within a recording mark formation region on the optical recording medium, a plurality of virtual recording cells are contiguously defined in a direction of movement relative to the laser beam, the virtual recording cells having a predetermined unit length and a predetermined unit width in a direction perpendicular thereto, a characteristic of the virtual recording cell is set so that (X−Y)/X is 0.3 or more, preferably 0.4 or more, where X(%) is an initial reflectivity of the virtual recording cell without being irradiated with the laser beam and Y(%) is a minimum reflectivity limit for a maximum recording mark formed by being irradiated with the laser beam, and at least either an irradiation time or an irradiation power of the laser beam is modulated in five stages or more to irradiate the virtual recording cell with the laser beam, thereby allowing for multi-level recording.

(19) The optical recording method according to (18), wherein when the recording marks are formed by switching at least either the irradiation time or the irradiation power of the laser beam in five stages or more to perform multi-level recording, the characteristic of the virtual recording cell is set so that a variation in reflectivity of all recording mark formation regions at each stage falls within 5%, preferably within 3%.

(20) The optical recording method according to (18) or (19), wherein the characteristic of the virtual recording cell is set so that (X−Y)/X≦0.9.

(21) An optical recording medium in which on an optical transparent substrate having predetermined grooves, a recording layer is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that 0.20×(λ/NA)< W<0.50×(λ/NA), where λ (nm) is the wavelength of the laser beam and NA is the numerical aperture of the objective lens for the laser beam in a irradiation optical system; a minimum thickness of the recording layer with respect to a bottom surface of the groove is set to be smaller than a depth of the groove on the optical transparent substrate at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

(22) The optical recording medium according to (21), wherein a characteristic of the virtual recording cell is set so that (X−Y)/X is 0.3 or more, preferably 0.4 or more, where X(%) is an initial reflectivity of the virtual recording cell without being irradiated with the laser beam and Y(%) is a minimum reflectivity limit for a maximum recording mark formed by being irradiated with the laser beam.

(23) An optical recording medium with an optical transparent substrate having predetermined grooves and a recording layer formed at least to cover the grooves, the recording layer being irradiated with a laser beam to form recording marks and record information at least on the recording layer, the optical recording medium wherein on the recording layer, virtual recording cells are contiguously defined along a feed direction of the laser irradiation for performing recording and reading operations on the groove, the virtual recording cell having a given unit length in the feed direction and a given unit width in a direction perpendicular thereto, a minimum thickness of the recording layer with respect to a bottom surface of the groove is set to be smaller than a depth of the groove on the optical transparent substrate, a characteristic of the virtual recording cell is set so that (X−Y)/X is 0.3 or more, preferably 0.4 or more, where X(%) is an initial reflectivity of the virtual recording cell without being irradiated with the laser beam and Y(%) is a minimum reflectivity limit for a maximum recording mark formed by being irradiated with the laser beam, and at least either an irradiation time or an irradiation power is set in five stages or more to irradiate the virtual recording cell with the laser beam, thereby allowing for forming recording marks having different sizes of five types or more on the virtual recording cell, and an entire optical reflectivity of the virtual recording cell is modulated based on an area ratio of the recording mark to the virtual recording cell, thereby allowing for recording information in multi-levels.

(24) An optical recording method for an optical recording medium with a recording layer formed on an optical transparent substrate and irradiated with a laser beam to form recording marks and record information on the recording layer, wherein within a recording mark formation region on the optical recording medium, a plurality of virtual recording cells are contiguously defined in a direction of movement relative to the laser beam, the virtual recording cells having a predetermined unit length and a predetermined unit width in a direction perpendicular thereto, a characteristic of the virtual recording cell is set so that (X−Y)/X is 0.3 or more, preferably 0.4 or more, where X(%) is an initial reflectivity of the virtual recording cell without being irradiated with the laser beam and Y(%) is a minimum reflectivity limit for a maximum recording mark formed by being irradiated with the laser beam, the groove width W is set so that 0.20×(λ/NA)<W<0.50×(λ/NA), where λ (nm) is the wavelength of the laser beam and NA is the numerical aperture of the objective lens for the laser beam in a irradiation optical system, and at least either an irradiation time or an irradiation power of the laser beam is modulated in five stages or more to irradiate the virtual recording cell with the laser beam, thereby allowing for multi-level recording.

(25) The optical recording method according to (24), wherein a minimum thickness of the recording layer with respect to a bottom surface of the groove is set to be smaller than a depth of the groove on the optical transparent substrate.

The inventor found that a new modulating method employing the occupation ratio of the recording mark to the virtual recording cell enables multi-level recording. As a result, the recording density can be dramatically improved.

However, it was also found that forming recording marks only by modulating the irradiation time or irradiation power would not make it possible in some cases to positively read the recording marks.

One of the reasons for this was conceivably that the multi-level recording which requires the setting of optical reflectivity in the virtual recording cell in multi-stages with high accuracy is particularly subject to the effect of the structure of the optical recording medium. More specifically, a number of studies made by the inventor showed that in the case of the present invention where recording marks were formed in multi-stages, recording marks smaller than the spot of the laser beam could be formed, thereby making it possible to set a narrower groove width in comparison with the prior art, while an error in optical reflectivity of each stage suddenly increased in the virtual recording cell when the groove width W was less than or equal to 0.20×(λ/NA) (0.25×(λ/NA) or less in the case where the recording layer was made of a phthalocyanine base dye). One of the reasons for this is presumably that the recording mark is restricted by the width of grooves so as not to be able to grow up to a predetermined size, thereby causing the degree of modulation to degrade.

Furthermore, for an uncertain reason, it was also found that such a phenomenon occurred that actual reflectivity levels were varied among a plurality of virtual recording cells that were expected to have the same reflectivity level as the groove width became narrower (i.e., reproducing repeatability was degraded), thereby significantly reducing signal quality (degrading error values).

On the contrary, cross-talk (a phenomenon of reading the recording mark in an adjacent groove at the same time in conjunction with the recording mark that should be originally read) may readily occur due to the effect of the recording mark in an adjacent groove when the groove width W is greater than or equal to 0.50×(λ/NA)(0.55×(λ/NA) or more in the case where the recording layer was made of a phthalocyanine base dye) with the track pitch remaining unchanged. To prevent this, it is necessary to increase the spacing between grooves (hereinafter referred to as the track pitch), however, an unnecessarily increase in track pitch causes the recording density to reduce.

Furthermore, for an uncertain reason, it has also been found that when relatively large recording marks are formed to provide the virtual recording cell with a low reflectivity level, the reflectivity varies significantly. This would lead to a degradation in signal quality such as a degradation in error value.

That is, it is necessary not only to set the groove width in response to the type of the recording layer or the like as in the current binary recording method but also to set the groove width suitable for the multi-level recording in order to perform the multi-level recording. Failure to set the groove width as such would result in degradation in signal quality characteristic of the multi-level.

This tendency, although currently under analysis, depends also on the linear velocity at the time of recording. It is thus necessary to select the groove width in response to the recording linear velocity. However, since the applicable range (margin) of grooves tends to become narrower as the recording linear velocity becomes higher (e.g., (8 times or more to about 20 times the standard linear velocity 1.2 m/s such as of a CD-R), such design as based on the assumption of recording at certain high velocities is conceivably able to cover the range of recording at low velocities.

This has been confirmed to be noticeable and useful particularly when the optical reflectivity is modulated in five stages or more to record information (in comparison with cases where the number of stages is less than this case). Incidentally, the aforementioned present invention may be added by the following configuration.

An optical recording medium characterized in that a groove for guiding a laser beam is provided along the recording layer, the virtual recording cell is set within the groove, and the unit width is generally equal to the width of the groove.

An optical recording medium characterized in that any identifying information indicative of multi-level recording, binary recording, and bar-code recording, which indicates that the optical recording medium is a multi-level recording medium, at the virtual recording cell or any position of the optical recording medium.

An optical recording medium characterized in that a groove for guiding a laser beam is provided along the recording layer, where the groove is interrupted in part.

Incidentally, what is meant here by the groove width means the width of the groove at the position that generally bisects the distance between the highest point of the land sandwiched by grooves and the maximum groove depth obtained by the lowest point of the groove bottom portion, being a value that is called a half-depth width in general. This definition derives from the consideration of a case where the groove (or the land) is trapezoidal in cross section. In addition, attention was also focused on the possibility that the desirable result would be provided by employing a shape or configuration that is different from that of the optical recording medium that was applied to conventional binary recording, as the configuration of an optical recording medium applied to the multi-level recording.

In the binary recording, a larger "difference" in optical reflectivity upon reading between binaries and a more distinct boundary (mark edge) between the binaries are desirable. To realize these, the thickness of the record film was set so as to be larger with respect to the depth of the groove (e.g., at 120% to 150% of the groove depth).

This allows the recording layer on the groove side to become continuous to the recording layer on the land side to some extent. Irradiating a region corresponding to the groove with a laser beam at a predetermined irradiation power would make it possible to extend (expand) the recording mark instantly towards the land. As a result, the amount of an absolute variation in optical reflectivity was increased and the mark edge was made distinct.

However, in the case of the multi-level recording technique according to the present invention for obtaining optical reflectivity in multi-stages by modulating the occupation ratio of the recording mark to the virtual recording cell, it is required to accommodate the optical reflectivity of each virtual recording cell within the allowable tolerance of each level. That is, conversely, expanding the recording mark freely as in the binary recording makes it difficult to control the optical reflectivity of each virtual recording cell.

On the aforementioned presumption, the present invention is adapted such that the minimum film thickness of the recording layer is set to be smaller than the depth of the groove with respect to the bottom surface of the groove. As a result, the recording layer depressed with respect to the groove allows for making the recording layer thinner in thickness (including the case of zero thickness) at the edge portion formed at the boundary between the groove and the land. This prevents the recording mark formed in the groove region from expanding towards the land and the recording mark formed on the land side from expanding towards the groove.

As a result, the recording mark is prevented from expanding unnecessarily with respect to the virtual recording cell in the width direction, making it possible to set the occupation ratio of the recording mark to the virtual recording cell with high accuracy and actually achieving the multi-level recording in five stages or more.

Incidentally, the aforementioned present invention may be added by the following structure.

An optical recording medium characterized in that the virtual recording cell is set to the region corresponding to the groove, and the unit width is generally equal to the width of the groove.

An optical recording medium characterized in that identifying information indicating that the optical recording medium is a multi-level recording medium is recorded on the virtual recording cell.

An optical recording medium characterized in that the groove is interrupted in part.

The inventor paid attention to both the variation characteristic in reflectivity of the virtual recording cell in the optical recording medium and the multi-level recording technique. In particular, the inventor paid attention to the dynamic range of reflectivity and/or the variation in reflectivity at the same recording level, and found that a better multi-level recording could be achieved when the former was greater than or equal to a certain value and/or the latter was within the range of predetermined values.

According to the analysis performed by the inventor, it was found that when a recording mark reduces reflectivity, some extent of the difference (dynamic range) is required between the reflectivity of a virtual recording cell having a maximum recording mark formed thereon and the reflectivity of a virtual recording cell having no recording mark formed thereon, in order to perform the multi-level recording of the virtual recording cell with a variation in reflectivity in five stages or more, wherein in the case of multi-level recording, the value of the dynamic range had adverse effect on recording and reading operations since the reflectivity of respective signals interferes with each other unless the reflectivity levels of the signals are spaced by a certain amount from each other.

In this context, various studies were made to properly perform recording and reading operations that were not affected by the interference between signals. As a result, it was found that the dynamic range had to be set to a value greater than or equal to a certain value by optimizing various structures such as the shape of the groove and the thickness of the recording layer particularly in order to perform a multi-level recording in five stages or more.

As the result of actual measurements, a multi-level recording was performed properly in five stages or more with the dynamic range being 30% or more, preferably 40% or more. In particular, the effect was remarkable when the length set to the virtual recording cell was shorter than the diameter of a beam.

Furthermore, within the same recording area, the variation in reflectivity has to be made less than that of the conventional binary recording at each stage of the multi-level recording.

The variation in reflectivity within the same recording area can be set by the number of stages of the multi-level recording, however, it was found that the aforementioned variation was preferably within 5% in the case of the multi-level recording in five stages or more. More preferably, the variation is 3% or less. In the case of the multi-level recording in five stages or more, a greater dynamic range is preferable, however, the upper limit is as shown by the aforementioned range since an excessive dynamic range causes distortion of signals to occur.

DETAILED DESCRIPTION OF THE PREFERRED EMBODIMENTS

Figure 1:
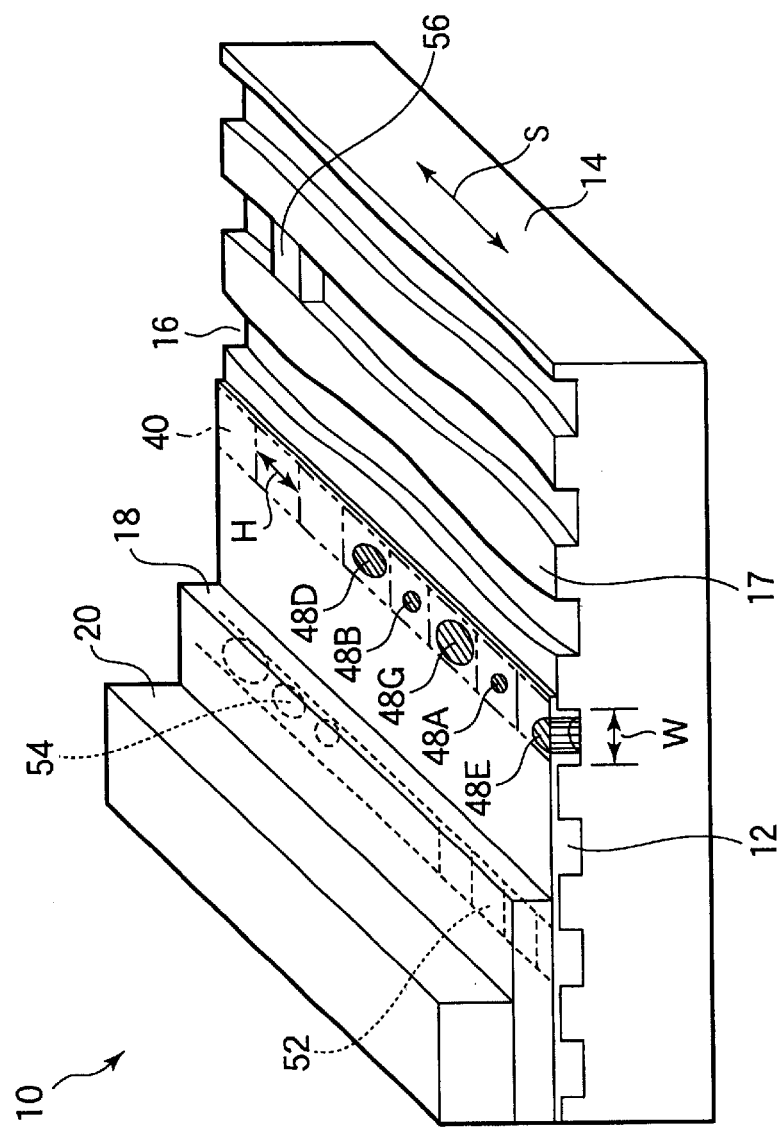
FIG. 1 is a partially exploded perspective view illustrating the main portion of an optical recording medium according to an embodiment of the present invention.

Now, the present invention will be explained below in detail with reference to the accompanying drawings in accordance with the embodiments.

An optical recording medium (disc) 10 according to an embodiment of the present invention is a CD-R (Compact disc-recordable) with a recording layer 12 made of a dye material. In this case, for example, the CD-R comprises a substrate 14 made of a transparent base material and the recording layer 12 made of a dye applied to cover grooves 16 for guiding a laser beam that are formed on one surface of the substrate 14 (on the upper surface in FIG. 1) in a spiral or concentric fashion about the center of the disc. The CD-R further comprises a reflective film 18, made of gold, silver or the like, formed through sputtering or the like on the upper side of the recording layer 12, and a protective layer 20 that covers the outside of the reflective film 18.

For example, the substrate 14 is made of various materials such as glass, acrylic resin such as poly-methyl methacrylate, vinyl chloride base resin such as poly-vinyl chloride or vinyl chloride copolymer, epoxy resin, polycarbonate resin, polyolefine resin, or polyester resin.

The dyes employed for the recording layer 12 include cyanine, merocyanine, and methine base dyes, and their derivatives. Also included are a metal complex of benzene thiol, and organic dyes such as phthalocyanine dye, naphthalocyanine dye, and azoic dye. The phase changing materials include GeSbTe base and AgInSbTe base materials in general. As an organic dye, it is preferable to mainly employ cyanine base dye that is expressed by the following general formula "Formula 1". For example, their specific examples include the following "Formula 2", "Formula 3", and "Formula 4".

[Formula 1]

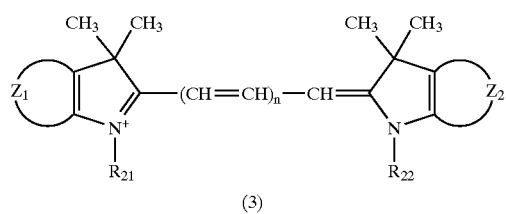

(3)

(In Formula, $Z_1$ and $Z_2$ each represent a condensed benzene ring or the condensed naphthalene ring. $R_{21}$ and $R_{22}$ each represent an alkyl group.)

[Formula 2]

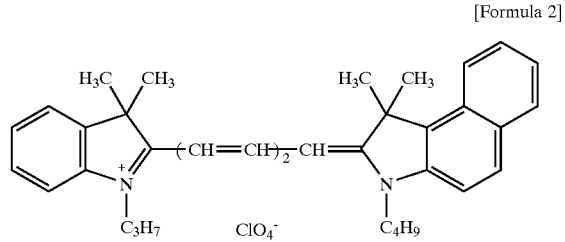

[Formula 3]

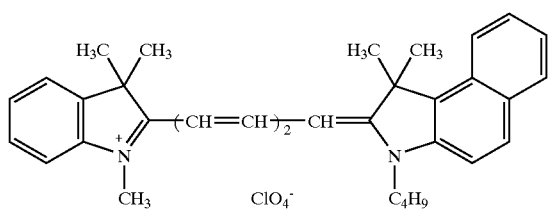

[Formula 4]

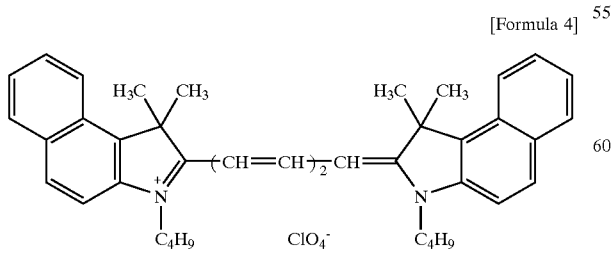

In addition, it is more preferable to employ, as the counter ion of the cyanine dye, the anion of substituted benzene thiol metal complex that is expressed by the following general formula "Formula 5".

[Formula 5]

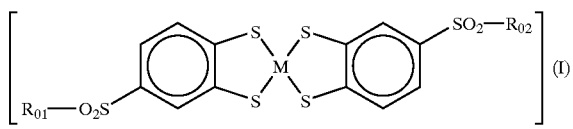

(I)

(In Formula, $R_{01}$ and $R_{02}$ each represent - - - )

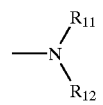

($R_{11}$ and $R_{12}$ each represent alkyl group or phenyl group having 1 to 4 carbon atoms.)

Specifically, for example, the following "Formula 6" is employed.

[Formula 6]

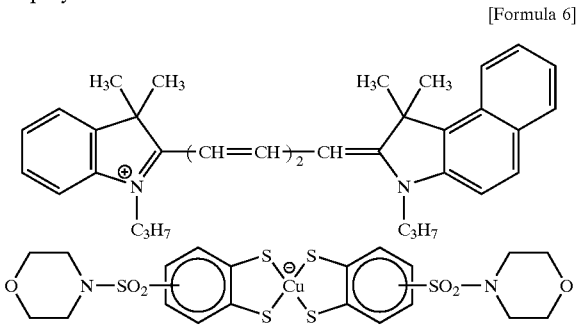

Any of these pentamethine cyanine dyes, in the form of a thin-film, has a maximal absorption wavelength near 680 nm, and provides preferable characteristics when irradiated with a laser beam having a wavelength of near 770 to 800 nm to form recording marks.

Incidentally, the aforementioned recording layer 12 may contain a singlet oxygen quencher in addition to an organic dye to stabilize the dye and prevent the dye from being oxidized. The content of the singlet oxygen quencher is about 5 to 50 weight percent in concentration with respect to the entire organic dye.

Furthermore, in addition to the cyanine base dye, phthalocyanine base dye and naphthalocyanine base dye can also be applied to the organic dye employed for the recording layer 12. It is preferable to mainly use the phthalocyanine base dye that is expressed by the following general formula "Formula 7". In addition, for example, the specific examples of them include the following "Formula 8".

[Formula 7]

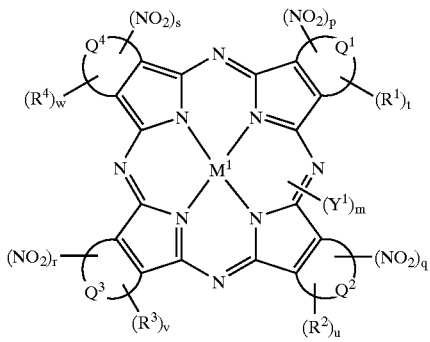

[Formula 8]

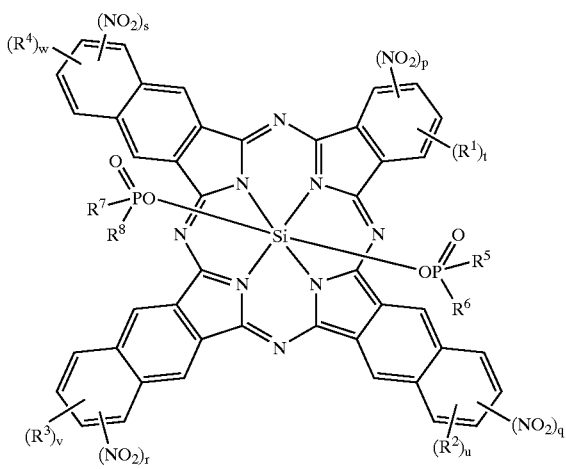

In "Formula 7", Q1, Q2, Q3, and Q4 each represent a group of atoms required to complete the benzene ring or the naphthalene ring. R1, R2, R3, and R4 each represent a monovalent substituent. M1 represents the center atom. Y1 represents a ligand that can coordinate to the center atom. P, q, r, and s each represent 0, 1, or 2. T, u, v, and w each represent 0, 1, or 2. M represents 0, 1, or 2.

The benzene ring is preferable as a condensed ring that is condensed to the pyrrole ring formed of Q1, Q2, Q3, and Q4.

For example, the monovalent substituents that are expressed by R1, R2, R3, and R4 include a halogen atom (chlorine, bromine, iodine, and fluorine atoms); a substituted or non-substituted alkyl group (a methyl, ethyl, hexyl, dodecyl, isopropyl, 2-ethylhexyl, t-butyl, neopentyl, trichloromethyl, 1,2-dichloroethyl, trifluoromethyl, pentafluoroethyl, 1,2,2-tetrafluoroethyl, heptafluoropropyl, and 2,2,3,3-tetrafluoropropyl group); a substituted or non-substituted aryl group (a phenyl, naphthyl, 3-methylphenyl, 3-methoxyphenyl, 3-fluorophenyl, 3-trichloromethylphenyl, 3-trifluoromethylphenyl, pentafluorophenyl, and 3-nitrophenyl group); a substituted or non-substituted alkoxy group (a methoxy, ethoxy, n-butoxy, tert-butoxy, 2-ethylhexyloxy, neopentoxy, 2,2,2-trichloroethoxy, 2,2,2-trifluoroethoxy, 2,2,3,3-tetrafluoropropoxy, 2,2,3,3,3-pentafluoropropoxy, 1,1,1,3,3,3-hexafluoro-2-propoxy, 2,2,3,4,4,4-hexafluorobutoxy, 1H,1H,5F-octafluoropentoxy, 1H,1H,7H-dodecafluoroheptoxy, 1H,1H,9H-hexadecafluorononyloxy, 2-(perfluorohexyl) ethoxy, 2-(perfluorooctyl) ethoxy, 2-(perfluorodecyl) ethoxy, 2-(perfluoro-3-methylbutyl) ethoxy, 6-(perfluoroethyl) hexyloxy, and 6-(perfluorohexyl) hexyloxy group); a substituted or non-substituted aryloxy group (a phenoxy, p-nitrophenoxy, p-tert-butylphenoxy, 3-fluorophenoxy, pentafluorophenyl, and 3-trifluoromethylphenoxy group); a substituted or non-substituted alkylthio group (a methylthio, ehylthio, tert-butylthio, hexylthio, octylthio, and trifluoromethylthio group); and a substituted or non-substituted arylthio group (a phenylthio, p-nitrophenylthio, p-tert-butylphenylthio, 3-fluorophenylthio, pentafluorothio, and 3-trifluorophenylthio group).

The alkyl group and alkoxy group are preferable among these substituents. As the alkyl group, particularly preferable is a substituted alkyl group having 1 to 12 carbon atoms, straight-chained or branched.

In this case, halogen atoms such as fluorine atoms are preferable as the substituent. In addition, as the alkoxy group, preferable is a substituted alkoxy group having 1 to 12 carbon atoms, where the alkyl portion of the alkoxy group may be straight-chained or branched.

In this case, halogen atoms such as fluorine atoms are preferable as the substituent.

The center atoms represented by M1 include hydrogen atoms (2H) or metallic atoms. At this time, for example, the metallic atoms include those that belong to family 1 to 14 in the periodic table (Family 1A to 7A, 8, and 1B to 4B), including specifically Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn, and Pb. Among them, preferable are Li, Ti, V, Cr, Mn, Fe, Co, Ni, Cu, Zn, Al, and Si, with Si being preferable in particular.

Incidentally, R1 to R4 in "Formula 1" are the same in general, but may be different in some cases.

The ligands that are represented by Y1 include a hydrogen atom, an oxygen atom, a halogen atom, a hydroxy group, an alkyl group, an alkoxy group, an acyloxy group, or a group represented by "Formula 9".

[Formula 9]

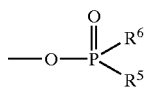

In "Formula 9", R5 and R6 each represent an alkyl group, an aryl group, an alkoxy group, or an aryloxy group, and may be the same or different.

Incidentally, the specific examples of the halogen atom, alkyl group, and alkoxy group that are represented by Y1, and those of the alkyl group, aryl group, alkoxy group, aryloxy group that are represented by R5 and R6 include the same ones as included in R1 to R4.

The acyloxy group that is represented by Y1 includes an acetoxy group and a propyonyloxy group and the like.

As Y1, the group expressed by "Formula 7" is preferable among other things, while the substituted or non-substituted alkyl group having 1 to 6 carbon atoms and aryl groups such as phenyl groups are preferable as R5 and R6.

The compounds in "Formula 7" that are expressed by "Formula 8" are preferable.

In "Formula 8", the R1, R2, R3, R4, p, q, r, S, t, u, v and w are equivalent to those of "Formula 7", respectively, and are preferable in the same way. In addition, the R5 and R6F are equivalent to those of "Formula 7", respectively, and are preferable in the same way. The R5 and R6 or R5A and R6 in "Formula 8" are the same to each other in general, respectively, but may be different in some cases.

The specific examples of "Formula 8" are shown in the following Table 1 as combinations of R1 to R5 and p to w.

TABLE 1

| Compound No. | R1 (=R2-R3-R4) | R5 (=R6) | p (=q=r=s) | t (=u=v=w) |
|---|---|---|---|---|
| 2-1 | —CF$_2$CF$_3$ | —Ph(Phenyl) | 1 | 1 |
| 2-2 | —CF$_2$CF$_3$ | +Ph(Phenyl)-C | 0 | 1 |
| 2-3 | —OCH$_2$CF$_3$ | $_4$H$_6$ | 1 | 1 |
| 2-4 | —CF$_2$CHF$_3$ | —Ph(Phenyl) | 1 | 1 |
| 2-5 | —OCH$_2$CF$_3$ | —Ph(Phenyl)-C | 1 | 1 |
| 2-6 | —OCH$_2$CF$_3$ | $_4$H$_9$ | 1 | 1 |

The recording layer 12 can be formed through spin coating as in the prior art. The organic solvent for use with a coating solution to form the recording layer through spin coating is preferably alcohol-based, ether-based, or hydrocarbon-based.

To control the thickness of a dye with respect to the depth of a group as in the present invention, various conditions of the spin coating are controlled. For example, this can be achieved by setting a smaller concentration in which a dye is dissolved in the aforementioned solvent to the condition for manufacturing an ordinary CD-R, and then by applying the resultant solution. This can also be achieved by setting a larger coating rpm to the spin coating condition as well as by controlling the environment at the time of applying a dye solution. For example, this can also be achieved by setting the environmental temperature to a lower temperature as well as by setting the environmental temperature to a higher temperature.

Figure 10:
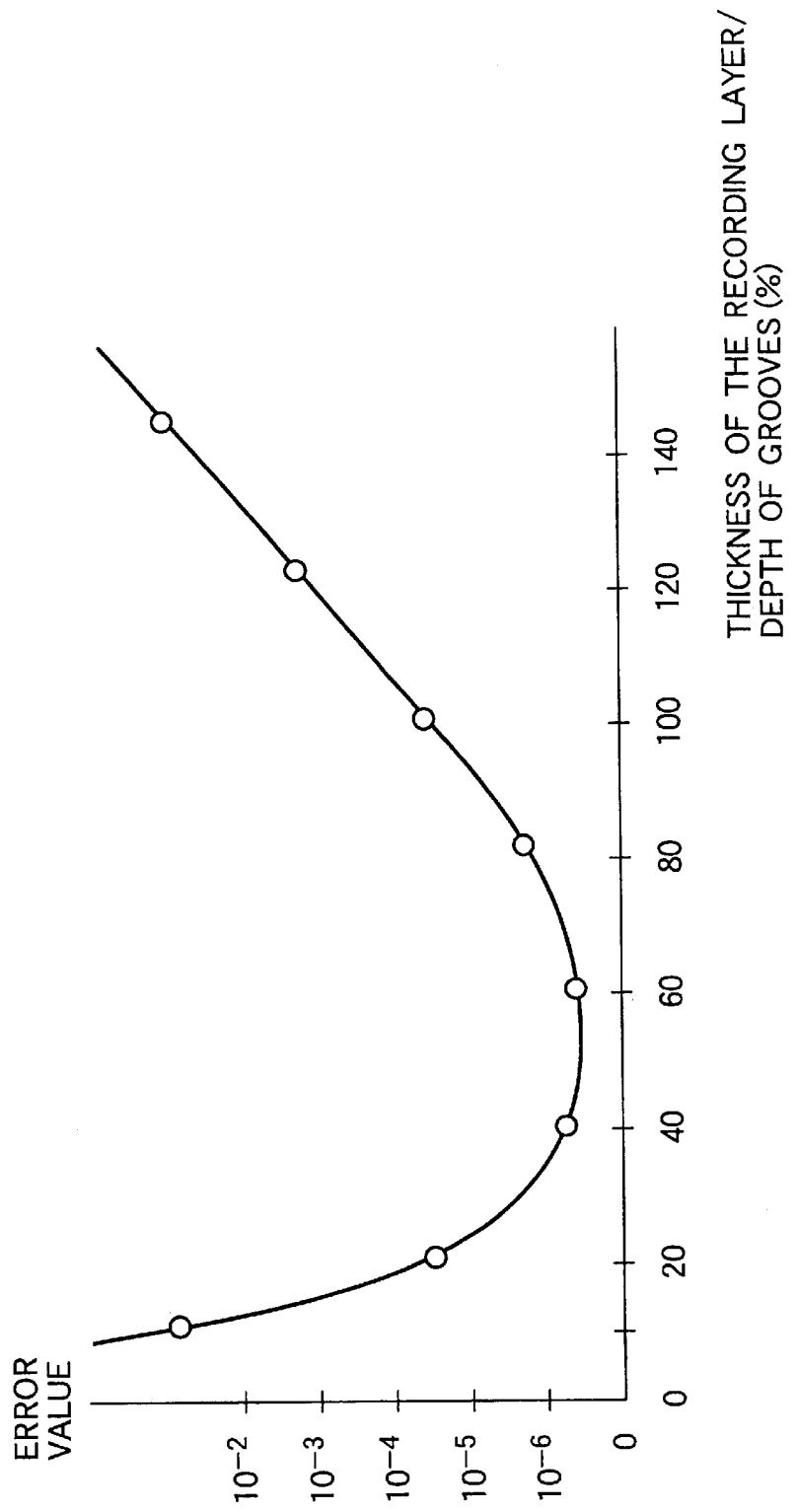
FIG. 10 is a diagram illustrating the effect of a ratio exerted on multi-level recording, the ratio being taken between the depth of a group and the thickness of a recording layer.

As shown being magnified in FIG. 10, the minimum film thickness M of the recording layer 12 with respect to a bottom face 16A of the groove 16 is set within the range of $0.2 \times F < M < 1.0 \times F$ in terms of depth F of the groove 16 (not including the recording layer 12) in the substrate 14. That is, the recording layer 12 (or at least part thereof) is concave with respect to the groove 16. Since the depth of the groove 16 is set to 200(nm) in the optical recording medium 10, the minimum film thickness M is set within the range of $40 < M < 200$(nm).

Preferably, the minimum film thickness M is set so that $0.3 \times F < M < 0.8 \times F$ ($60 < M < 160$(nm) in this embodiment). More preferably, the minimum film thickness M is set so that $0.4 \times F < M < 0.6 \times F$ ($80 < M < 120$(nm) in this embodiment). In particular, this makes it possible to provide the optical recording medium 10 that is suitable for recording information in multi-levels at velocities of 8× to 20×.

Figure 2:
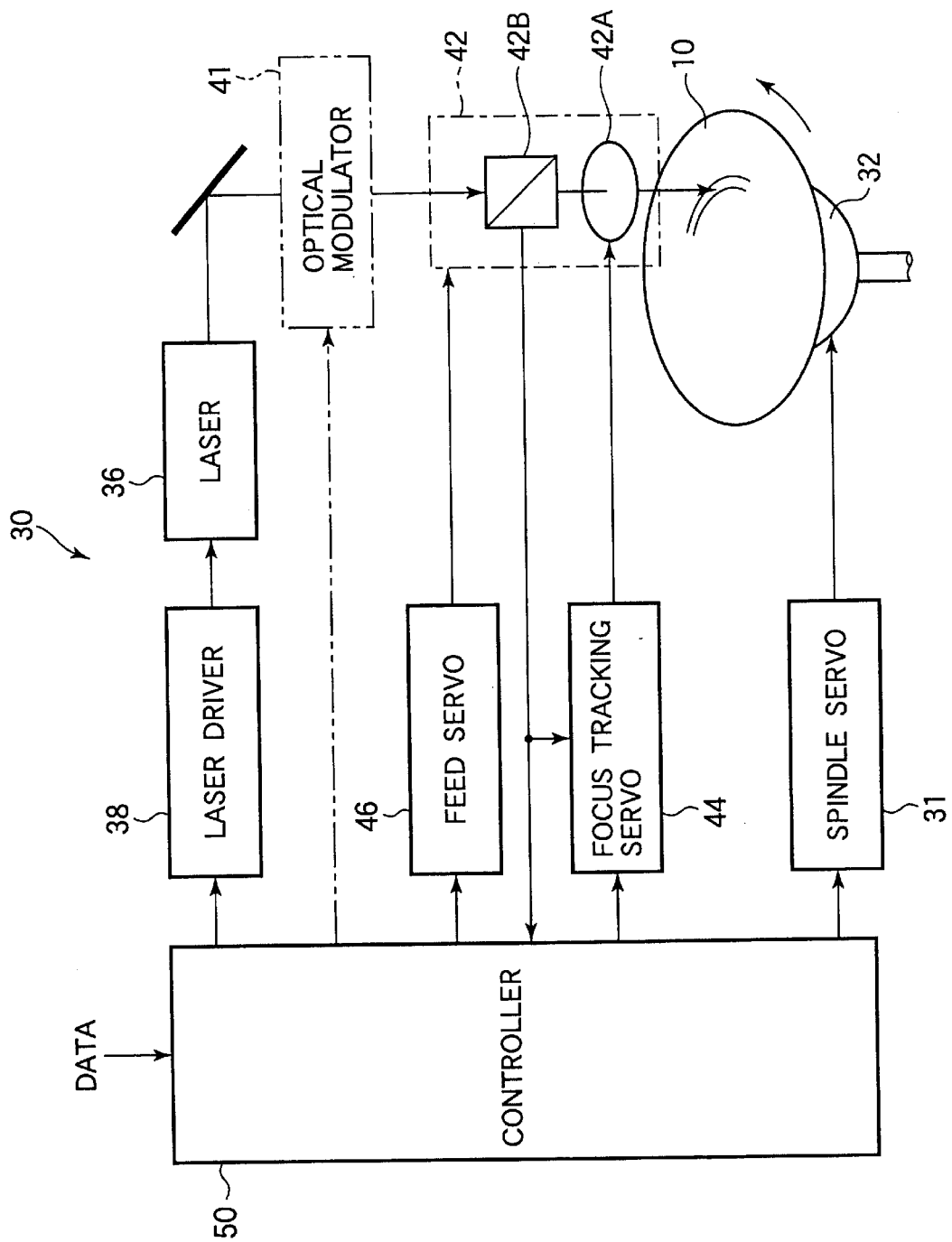
FIG. 2 is a block diagram illustrating an optical recording apparatus for recording information on the optical recording medium using a laser beam.

The optical recording medium 10 is recorded in multi-levels with an optical recording apparatus 30 shown in FIG. 2.

The optical recording apparatus 30 is a CD-R/RW recorder, adapted to rotatably drive the optical recording medium (disc) 10 in a condition of a constant linear velocity with a spindle motor 32 via a spindle servo 31 and then record information on the optical recording medium (disc) 10 with a laser beam from a laser 36.

In response to information to be recorded, a laser driver 38 is adapted to control the duration in time of laser beam irradiation per one of virtual recording cells (described later) 40, shown in FIGS. 1 and 4, such as the number of laser pulses to be input to the laser 36.

In other words, the laser 36 is adapted such that in response to information to be recorded, the laser driver 38 controls the duration in time of laser beam irradiation per one of the virtual recording cells (described later) 40, shown in FIGS. 1 and 4, such as the number of laser pulses and/or the irradiation power such as the pulse height.

Reference numeral 42 of FIG. 2 is a irradiation optical system that includes an objective lens 42A and a half mirror 42B. The objective lens 42A is subjected to focus tracking control provided by a focus tracking servo 44 such that the laser beam is focused on the recording layer 12 of the disc 10. In addition, the objective lens 42A and the half mirror 42B are controllably moved with a feed servo 46 in phase with the rotation of the optical recording medium (disc) 10 at a predetermined velocity from the inner to outer circumference.

The spindle servo 31, the laser driver 38, the focus tracking servo 44, and the feed servo 46 are controlled by means of a f 50. The data (information) to be recorded onto the recording layer 12 is input into the controller 50.

Incidentally, to modulate the irradiation power of a laser beam, in addition to the control of the pulse height as mentioned above, an optical modulator 41 may be disposed on the optical path of the laser beam to use means for controlling the optical modulator 41 with the controller 50, as shown by a phantom line in FIG. 2.

Figure 3:
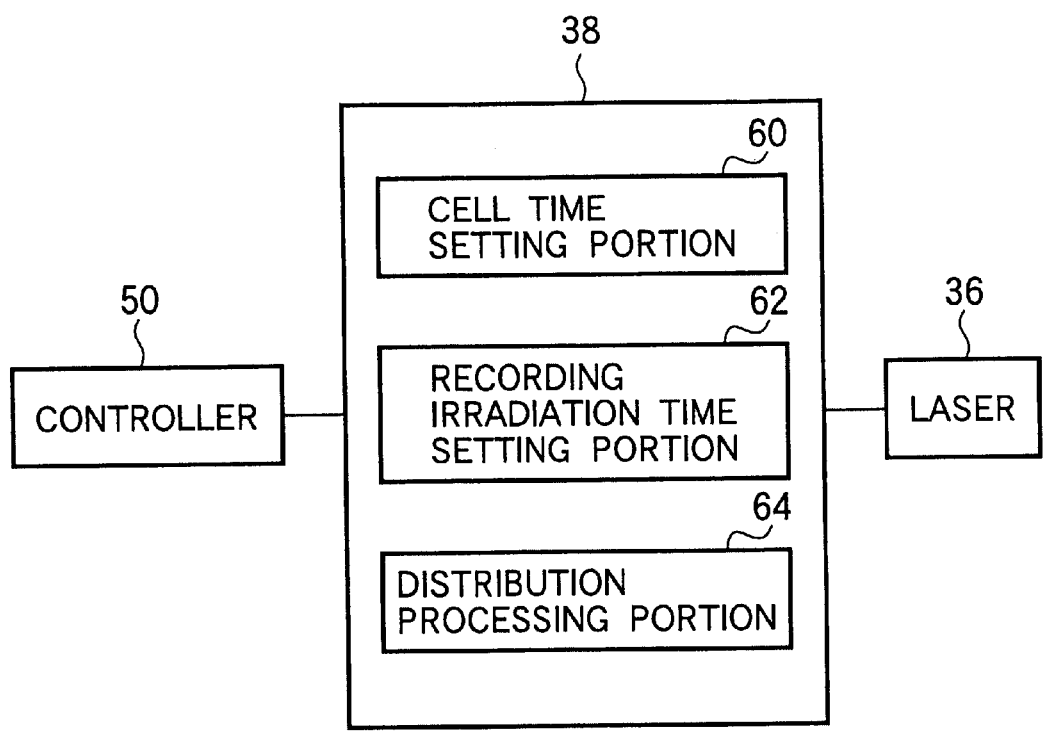
FIG. 3 is a block diagram illustrating the configuration of a laser driver incorporated into the optical recording apparatus.

As specifically shown in FIG. 3, the laser driver 38 comprises a cell time setting portion 60, a recording irradiation time setting portion 62, and a distribution processing portion 64.

The cell time setting portion 60 specifies a predetermined cell time T contiguously (T1, T2, T3, T4, T5, T6 . . . ). As a result, for example, a virtual recording cell 40 of length H equal to "v×T" is defined contiguously on the optical recording medium (disc) 10, where v is the movement velocity (linear velocity) of the optical recording medium 10 with respect to the laser 36.

The recording irradiation time setting portion 62 specifies irradiation time tA, . . . , tG in five stages or more (here seven stages of tA to tG) within the aforementioned cell time T. In this case, the irradiation time tA, . . . , tG, pre-recorded in a memory, may be read out to be thereby defined, or may be defined by reading information on recording irradiation time written on the optical recording medium 10.

The distribution processing portion 64 modulates original information stored in the controller 50 to set bit trains for multi-level recording, which are in turn assigned to each cell time T. For example, the bit train for multi-levels is {B, E, D, C, G, G, . . .} because of the presence of recording marks of seven stages (A, B, C, D, E, F, and G) in this case. Each of these numerical values means the level of recording mark to be formed on each recording cell 40. Accordingly, the aforementioned irradiation time tA to tG is assigned to each cell time T1, T2, . . . so as to correspond to each level of the aforementioned bit train.

Now, the virtual recording cell 40 and the recording mark to be recorded on the virtual recording cell 40 are explained.

As shown in FIG. 1, on the optical recording medium 10, the virtual recording cells 40 are contiguously defined in the grooves 16 in the rotational direction of a disc 34 or in circumferential direction S. Each of the virtual recording cells 40 has a unit length of H (=v×T) in the circumferential direction S, where H is defined to be shorter in length than the beam diameter (the diameter of the beam waist) D (see FIG. 4). Incidentally, a land 17 is formed between adjacent grooves 16.

In the virtual recording cell 40, the unit width orthogonal to the aforementioned unit length H (=v×T) is generally equal to width W of the aforementioned groove 16. Each of the virtual recording cells 40 is irradiated with a laser beam, thereby forming recording marks 48A to 48G, exemplified schematically, in response to information to be recorded.

More specifically, the laser irradiation time of the laser beam emitted from the laser 36 is changed as appropriate. This allows the recording marks 48A to 48G to be formed not on the entire beam spot but at the center of the laser beam. (The laser beam is circular in shape, however, the recording mark is formed in the shape of an ellipse having a length corresponding to the irradiation time since the disc 10 is irradiated with the laser beam while being rotated.) In addition, the recording mark increases in width in response to the irradiation time and the irradiation power.

This is conceivably because a focused laser beam has in general a Gaussian distribution, however, only such a portion of the laser beam having a irradiation energy greater than a threshold value performs recording on the recording layer 12, and therefore the irradiation time and/or the irradiation power of the laser beam is varied, thereby changing the spot size of the laser beam available for recording the recording layer 12 such that the spot size expands from the center to outside in sequence. For example, as shown in FIG. 4, this makes it possible to form seven stages of recording marks 48A to 48G of different occupation ratios to the virtual recording cell 40.

In this case, the size (area) of each of the recording marks 48A to 48G is set such that when the virtual recording cell 40 is irradiated with a laser beam for reading operations, the reflected light takes seven stages of optical reflectivity. The optical reflectivity increases as the recording mark decreases in size, with the maximum reflectivity in a virtual recording cell having no recording mark formed thereon and the minimum reflectivity in a virtual recording cell having the maximum recording mark 48G formed thereon. In more detail, the optical reflectivity is set in consideration of the area ratio of each of the recording marks 48A to 48G to the virtual recording cell 40 and the optical transmittance of the recording mark itself. That is, the recording mark is determined with the ratio of occupation to the virtual recording cell 40 including optical reflectivity.

When the material forming the recording layer 12 is irradiated with a laser beam and thereby decomposed and degraded, the optical transmittance of the recording marks 48A to 48G themselves varies depending on a change in their refractive index and the amount of change of the recording layer 12 in the width direction. If the recording mark portions formed are zero in optical transmittance, then there is no need to take it into consideration but to follow only the aforementioned ratio of occupation.

The width W of the groove 16 is set so that $0.20\times(\lambda/NA)<W<0.50\times(\lambda/NA)$, where $\lambda$ is the wavelength of the laser beam of the laser 36 and NA is the numerical aperture of the objective lens 42A of the irradiation optical system 42. For example, in this embodiment, since $\lambda=785$(nm) and NA=0.5, the groove width W is set to such a range that $0.31<W<0.79(\mu m)$. Incidentally, preferably, the groove width W is set so that $0.25\times(\lambda/NA)<W<0.45\times(\lambda/NA)$, and thus set to such a range that $0.39<W<0.71$ under the aforementioned conditions.

Furthermore, the depth of the grove is preferably 70 nm to 300 nm, more preferably one the order of 100 to 250 nm. What is meant here by the depth of the groove is the difference in height (depth) between the deepest point of the groove and the highest point of the land in the vertical direction. Moreover, unless otherwise specified, in general, the width of the groove at about half the depth thereof is referred to as the half-depth width, and this half-depth width is employed as the groove width in the present invention.

Incidentally, when the recording layer 12 is made of a phthalocyanine base dye, the groove width W is set so that $0.25\times(\lambda/NA)<W<0.55\times(\lambda/NA)$. For example, in this embodiment, since $\lambda=785$(nm) and NA=0.5, the groove width W is set to such a range that $0.39<W<0.86(\mu m)$. Incidentally, preferably, the groove width W is set so that $0.30\times(\lambda/NA)<W<0.50(\lambda/NA)$, and thus set to such a range that $0.47<W<0.79(\mu m)$ under the aforementioned conditions, more preferably $0.50<W<0.71(\mu m)$.

Furthermore, the depth of the grove is preferably 50 nm to 300 nm, more preferably one the order of 50 to 200 nm.

Furthermore, in this embodiment, the spacing P between adjacent grooves 16 (track pitch) is set so that $0.65\times(\lambda/NA)<P$, preferably $0.7\times(\lambda/NA)<P<1.2\times(\lambda/NA)$. Now, the optical recording medium 10 prepared as such is described with reference to the characteristics of reflectivity.

In this disc 10, the characteristics of the virtual recording cell 40 are so set that (X−Y)/Y is 0.3 or more, preferably 0.4 or more, where X% is the initial reflectivity of the virtual recording cell 40 that has not yet been irradiated with the laser beam, and Y% is the reflectivity (minimum reflectivity) of the maximum recording mark that has been irradiated to its limit with the laser beam (for a relatively long duration in time). In addition, (X−Y)/X is set so as to equal 0.9 at maximum.

Furthermore, in the disc 10 according to this embodiment, when the recording mark is irradiated with the laser beam switched in five stages or more of irradiation time for multi-level recording and thereby formed, the virtual recording cell 40 is set to have characteristics such that the variation in reflectivity lies within 5%, preferably within 3% in each stage across the entire recording region (recording area).

More specifically, the area of the virtual recording cell 40, the material of the recording layer 12, and the diameter D of the beam waist of the laser beam are adjusted for the setting. For example, when a recording mark made larger in size with respect to the virtual recording cell 40 causes the dynamic range of the reflectivity to increase, and the variation in reflectivity to increase as well.

In the case of multi-level recording in five stages or more, the characteristics of the disc 10, set as described above, allow the difference between respective recording stages, that is, the difference between respective absolute values of reflectivity in each stage in the virtual recording cell 40 to distinguish between respective recording stages (recording marks).

The aforementioned dynamic range varies depending on the width and depth of the groove 16. In the case of a dye recording medium, the dynamic range also varies depending on the conditions of the dye (such as the thickness of the dye layer itself and the thickness of the dye with respect to the depth of the groove). Thus, to satisfy various characteristics, it is necessary to optimize each of them to ensure the dynamic range.

In the multi-level recording according to the present invention, the dynamic range 0.3 or more, preferably 0.4 or more, makes it possible to perform recording or reading with less errors and reduce the amount of jitter. Furthermore, it is also possible to provide good values of non-recorded radial contrast and push-pull signals.

Preferable values of them include 0.02 or more of non-recorded radial contrast, 0.03 or more of push pull, and 30 dB or more of wobble to noise ratio.

In addition, larger upper limit values of the dynamic range are more preferable, however, it has become clear that larger dynamic ranges cause an extreme increase in variation of the relative reflectivity of a mark having a low reflectivity with respect to the virtual recording cell 40.

An increase in variation of the relative reflectivity causes an increase in error rate of reading signals (generally called an error), and therefore $(X-Y)/X \leq 0.9$ is the preferable range in order to prevent this.

Furthermore, the length of the recording marks 48A to 48G to be recorded in multi-levels may be made equal to or less than the diameter D of the converging beam waist of the read laser, thereby making it possible to detect data positively.

As a result, extremely small recording marks less than or equal to the converging beam waist can be created in five stages of reflectivity or more, thereby making it possible to obtain an optical recording medium having a considerably high recordable density.

In addition, in the aforementioned invention, it is preferable to form the recording layer of the optical recording medium containing an organic dye component. In practice, as described later in an example, the aforementioned multi-level recording is accomplished according to a method for creating a recording mark through the reaction of an organic dye component. Each of the virtual recording cells 40 is irradiated with the laser beam to form the schematically exemplified recording marks 48A to 48G in response to the information to be recorded.

More specifically, the recording marks 48A to 48G are formed so as to include the following steps.

To record actual information onto the optical recording medium 10, the virtual recording cell 40 is contiguously defined as already described in setting the cell time T in order to set the irradiation time tA to tG of the laser beam for the virtual recording cell 40.

Figure 5:
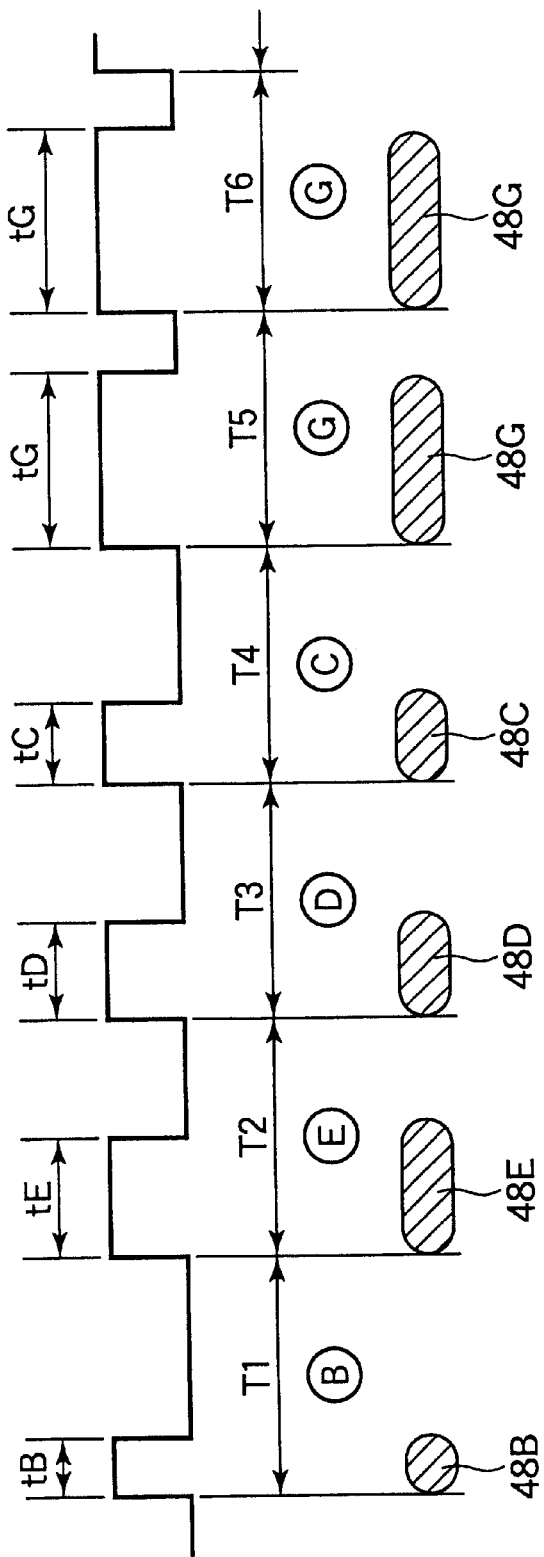
FIG. 5 is a diagram illustrating the process of generating a timing chart of a laser beam irradiation upon forming the recording mark on the recording layer using the optical recording apparatus.

As a result, as shown in the time chart of FIG. 5, the irradiation times {tB, tE, tD, tC, tG, tG, . . . } are assigned to the cell times T1, T2, T3, . . . , respectively, corresponding to the bit train {B, E, D, C, G, G, . . . } obtained by modulating original information. Incidentally, such a case is shown here where the irradiation time t is set from the head of each cell time T (i.e., with respect to the front end). However, in some cases, the irradiation time is set to the middle of each cell time T (with respect to the middle) or the irradiation time is set with respect to the tail of each cell time T (with respect to the tail end).

Actual formation of recording marks 48A to 48G, being irradiated with the laser beam at the irradiation time t in accordance with this time chart, makes it possible to set each virtual recording cell 40 to a desired optical reflectivity.

According to the optical recording medium 10 of the aforementioned embodiment, the irradiation time is controlled, thereby achieving multi-level recording in five stages or more.

In particular, since the groove width W and the track pitch P are set within a predetermined range, the recording marks 48A to 48G can be formed with accuracy at a high density. This means that the error between the actual optical reflectivity and the target optical reflectivity of each level is to be reduced.

The operation of the optical recording medium 10 according to this embodiment is described.

Figure 6:
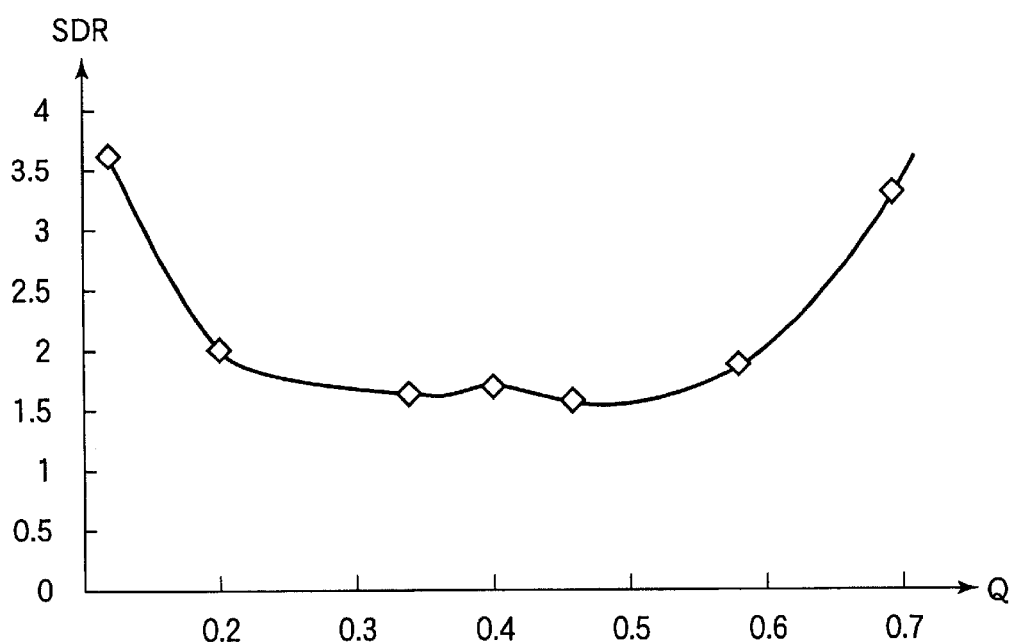
FIG. 6 is a diagram illustrating the variation in SDR value upon performing multi-level recording on optical recording media of different groove widths.
Figure 7:
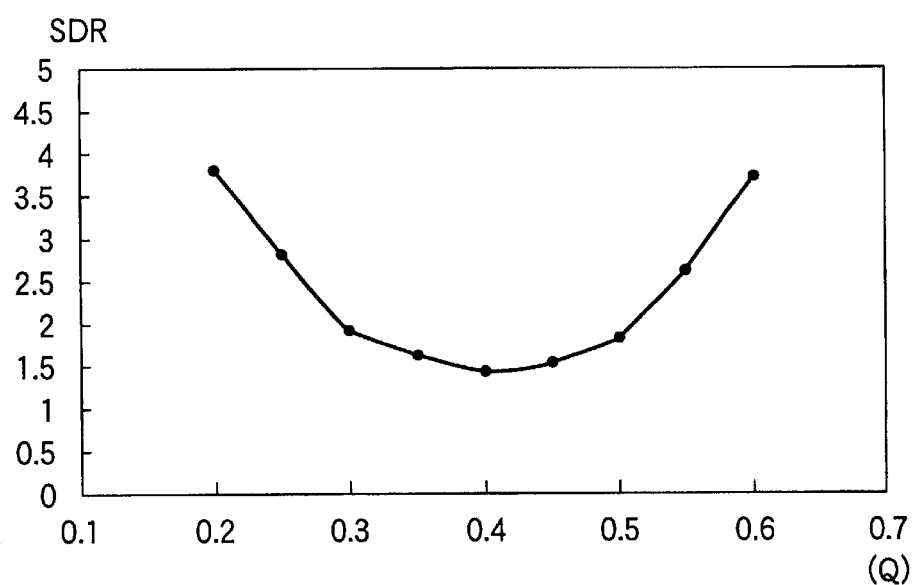
FIG. 7 is a diagram illustrating the variation in SDR value upon performing multi-level recording on optical recording media of different groove widths as in FIG. 6 when the recording layer is made of phthalocyanine base dye.

FIG. 6 illustrates the results of analysis performed by the inventor. In addition to this, FIG. 7 shows the results of analysis when a phthalocyanine base dye is used for the recording layer. More specifically, the groove width W was defined by Q×(λ/NA). A plurality of optical recording media having different Q values or different groove widths W were prepared, and each recording medium was recorded in multi-levels. Then, SDR values were measured which were caused by variations in optical reflectivity of the virtual recording cells at this time.

What is meant by the SDR (Sigma to Dynamic Range) value is a variation of signal at each stage that is determined by the reflectivity at each stage of the multi-levels and the dynamic range (the difference between the maximum and minimum reflectivity). More specifically, the SDR value is a value expressed by normalizing the standard deviation σ of reflectivity with the dynamic range. It is needless to say that less variations make it possible to perform good recording and reading operations of signals. According to experiments carried out by the inventor, the SDR value is preferably 5% or less, more preferably 3% or less. Here, the target was made equal to 2% or less.

As can be seen from the results, the SDR increased at Q=0.20 or less (Q=0.25 or less when a phthalocyanine base dye was employed for the recording layer), where the value Q defines the groove width W. This is presumably because an excessively narrow groove width W caused insufficient formation of the recording marks 48A to 48G, or phenomena such as variations in actual reflectivity level of virtual recording cells having the same reflectivity level caused a significant decrease in signal quality, thereby affecting the optical reflectivity that was principally determined by the occupation ratio of the recording marks 48A to 48G to the virtual recording cell 40.

On the contrary, a wider groove width W causes a virtual recording cell 40 to vary more significantly in reflectivity, the virtual recording cell 40 being provided with a recording mark of a low reflectivity level (a large recording mark), thereby resulting in degradation of signal quality.

Figure 8:
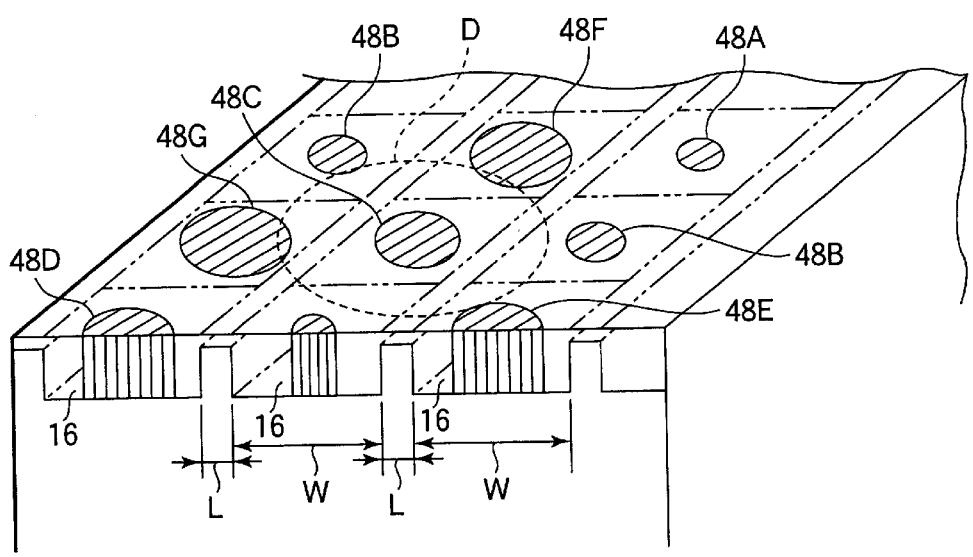
FIG. 8 is a perspective view illustrating the state of a multi-level recorded optical recording medium having excessive groove widths.

Furthermore, for example, with the track pitch P being set to 1.0 μm, multi-level recording is carried out to an optical recording medium having the aforementioned Q value being set to 0.50 (0.55 in the case of using a phthalocyanine base dye for the recording layer), which is schematically shown in FIG. 8. This ensures a sufficient groove width W, and it is therefore highly possible that the recording marks 48A to 48G having desired sizes or greater have been formed. However, since the land width L is considered to become relatively narrower, a laser beam spot D sits across adjacent grooves 16 at the time of reading operations. It is thus highly possible to read the recording marks 48A to 48G within the adjacent grooves 16 at the same time, thereby making it difficult to obtain the desired optical reflectivity.

That is, it is necessary not only to set the groove width W in response to the type of the recording layer or the like as in the current binary recording method but also to set the groove width W suitable for the multi-level recording in order to perform the multi-level recording. Failure to set the groove width W as such would result in degradation in signal quality characteristic of the multi-level, however, proper setting as in this embodiment makes it possible to obtain the desired optical reflectivity.

In addition, preventing the error (offset) of optical reflectivity as in the foregoing would make it possible to reduce the level stages in width and thus increase the number of total levels (7 stages of A to G here), thereby making it possible to increase the recoding density of the optical recording medium.

Figure 12:
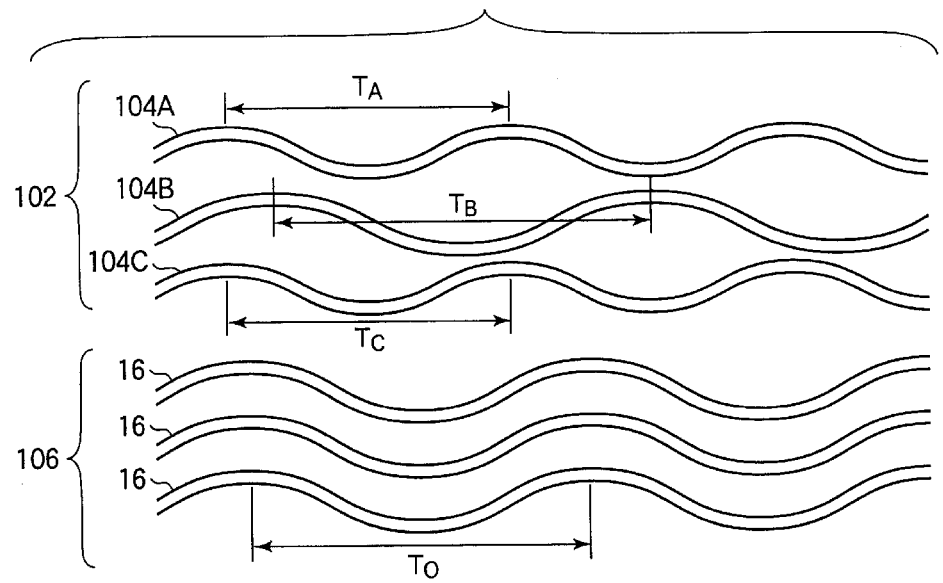
FIG. 12 is an enlarged schematic view illustrating the wobble on which various information are recorded on the optical recording medium of the present invention.

FIG. 12 is a schematic perspective view illustrating the configuration of a conventional optical recording medium K. Conventionally, the thickness M of the recording layer R is greater than the groove depth F (120% to 150%). Accordingly, the recording layer R continues in a sufficient thickness from a groove to a land, thereby making it possible to easily form the recording mark C greater than the groove width W. This is to allow the "difference" in optical reflectivity between two values to be set greater for reading operations.

Figure 9:
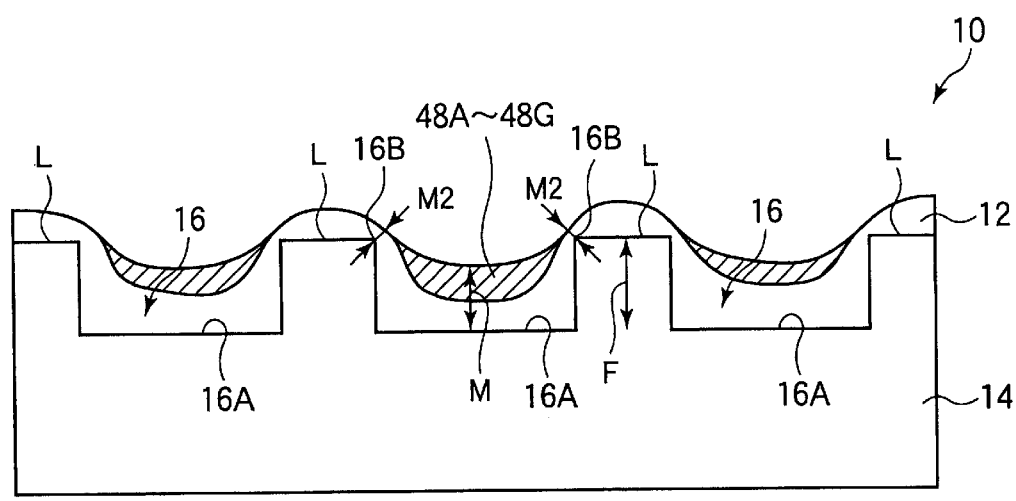
FIG. 9 is an enlarged cross-sectional view illustrating the vicinity of grooves of the optical recording medium.

However, as already shown in FIG. 9, the optical recording medium 10 of this embodiment is adapted such that the minimum film thickness M of the recording layer 12 is set to be less than the depth F of the groove 16, thereby making it possible to make the film thickness Ml thin (including a thickness of zero) near the edge (corner) 16B that is formed at the boundary between the groove 16 and the land. As a result, the recording marks 48A to 48G formed on a region corresponding to the groove 16 in the recording layer 12 are prevented from expanding towards the land L. Although not illustrated here, even when the land L is irradiated with the laser beam to form the recording mark, it is possible to prevent the recording mark from expanding towards the groove 16.

As a result, the recording marks 48A to 48G are prevented from expanding unnecessarily in the width direction with respect to the virtual recording cell 40, thereby making it possible to set the occupation ratio of the recording mark to the virtual recording cell (i.e., the optical reflectivity upon reading operations) with high accuracy.

What is meant here by the unnecessary expansion is principally different from the case of binary recording.

The expansion of group in the width direction in binary recording occurs in all marks to be applied, thereby yielding almost no difference in expansion between the marks.

However, in the case of the multi-level recording according to the present invention, in comparison with marks having a smaller occupation ratio to the virtual recording cell 40 (i.e., a high relative reflectivity of the entire cell), expansion of marks having a larger occupation ratio in the direction of the group width turns into problems. In summary, recording marks having the smaller occupation ratio and even with a conventional thickness of dye may extend at a small rate from the virtual recording cell 40 or the group 16. However, marks having the larger occupation ratio but still with the conventional thickness of dye may expand unnecessarily with respect to the virtual recording cell 40 or the group 16 in the width direction, thereby resulting in degradation in signal. That is, the expansion of recording marks in multi-levels may cause an increase in variation between respective signals.

From this point of view, the width of group may be conceivably set in accordance with the condition of the recording layer. However, the group width is subjected to a predetermined restriction due to its effects on other signals of various types such as the tracking signal. Thus, to perform proper recording and reading operations with a group width being predetermined to some extent, it is preferable to positively control the film thickness of the dye.

In particular, as in this embodiment, setting the minimum film thickness M of the recording layer 12 with respect to the groove depth F so that $0.4 \times F < M < 0.6 \times F$ makes it possible to provide a good recording characteristic upon writing operations at a high velocity of 10× or more (preferably at a velocity of 12× or more). This has been actually confirmed by the inventor.

In addition, preventing the error (shift) of optical reflectivity as such makes it possible to reduce the width of a level stage and thereby increase the number of total levels (seven stages of A to G here), allowing the optical recording medium 10 to further increase in recording density.

Figure 4:
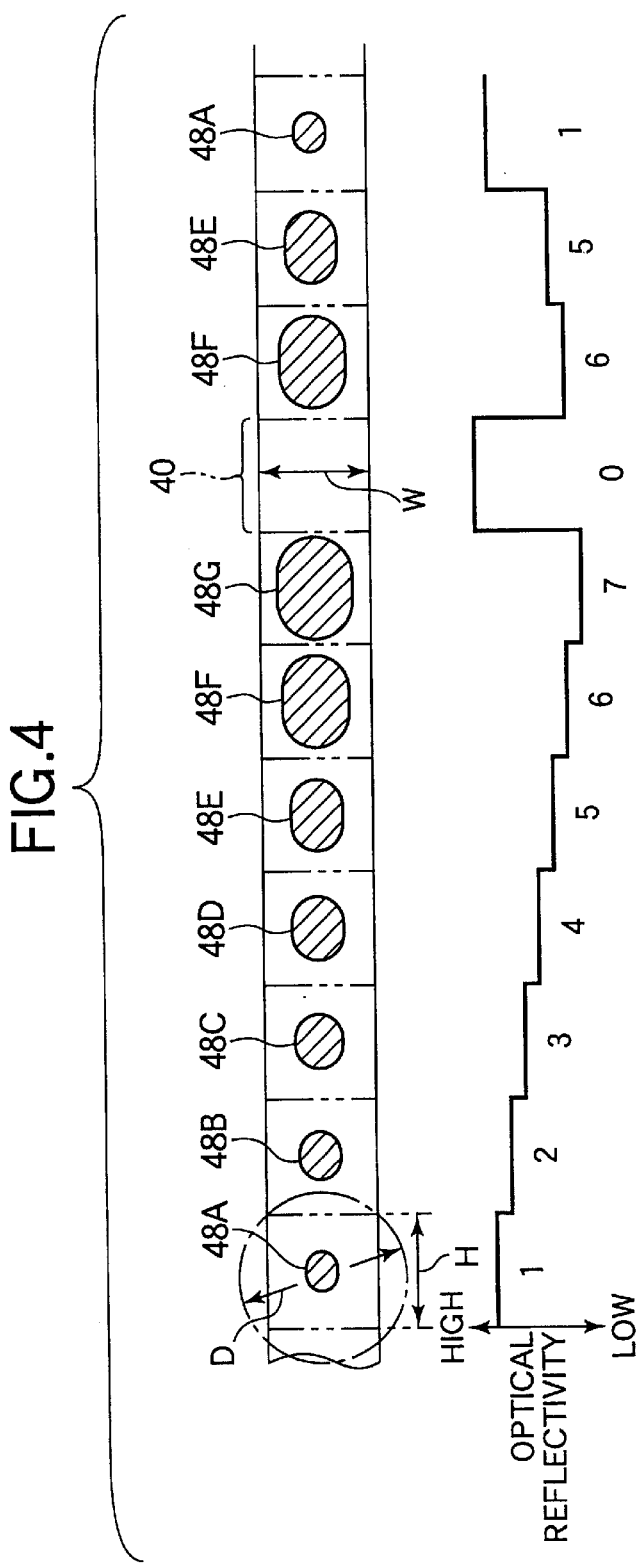
FIG. 4 is a schematic view illustrating the relationship between a recording mark, a virtual recording cell, and their optical reflectivity upon forming the recording mark on the recording layer using the optical recording apparatus.

In addition, as shown in FIG. 4 in this embodiment, data can be read sufficiently even when recording marks (all the recording marks 48A to 48G here) are formed in a length or width less than or equal to the diameter D of the converging beam of the reading laser. The recording density per unit area has been thus dramatically increased in comparison with the conventional case.

Incidentally, in the aforementioned embodiment, such a case has been shown which includes a cyanine base dye such as "Formula 2" and "Formula 4" as the recording layer 12, however, the present invention is not limited thereto. For example, a preferable result may be obtained using a mixture of pentamethine cyanine dyes from "Formula 8" and "Formula 9".

In addition, in this embodiment, such a case has been described where the optical recording medium 10 has the recording layer 12 mainly made of a pentamethine cyanine dye and functions as a CD-R, however, other cyanine dyes may be used.

FIG. 10 shows the result of analysis provided by the inventor. Specifically, optical recording media were prepared which had different thicknesses of dye with respect to the depth of group. A multi-level recording was then performed on each of the optical recording media. Error values were determined for analysis according to the inventor's own calculation method in the comparison between recording and read signals.

The error value was determined by using a digital oscilloscope to measure the recording and reading signals, which were then processed in a computer to thereby determine the difference between the recorded and read signal. The inventor provided his own criteria for the value.

As can be clearly seen from this result, the ratio of the thickness of dye to the group depth being less than or equal to 20% caused the signal read error rate to increase. This is conceivably because an excessively small thickness of dye caused a variation in multi-level signal of multi-stages, thereby making it impossible to distinguish the signal.

On the contrary, the ratio of the dye thickness to the group depth being greater than or equal to 100% causes the error rate to increase as well. This is conceivably because a variation in reflectivity between virtual recording cells has increased in which marks of a low reflectivity level (large recording marks) are formed, resulting in a total increase in error value.

Furthermore, in this embodiment, such a case has been described in which the optical recording medium 10 has the recording layer 12 mainly made of an organic dye material and functions as a CD-R. However, it may also be acceptable to use an optical recording medium of a CD-RW type which employs a phase changing recording layer as the recording layer. Alternatively, it may also be acceptable to use an optical recording medium other than a CD-R/RW.

In addition, as shown in FIG. 4 in this embodiment, data can be read sufficiently even when recording marks (all the recording marks 48A to 48G here) are formed in a length or width less than or equal to the diameter D of the converging beam of the reading laser. The recording density per unit area has been thus dramatically increased in comparison with the conventional case.

Incidentally, in this embodiment, such a case has been shown in which all recording marks are made less than or equal to the diameter D of the converging beam. However, the present invention is not limited thereto but includes such cases in which only part of a recording mark is less than or equal to the diameter D or in which all the recording marks are less than or equal to the diameter D of the converging beam.

Furthermore, in the aforementioned optical recording apparatus 30, such a case has been shown in which the laser driver 38 is used to set the irradiation time of a laser beam. In addition to this, it is also acceptable to use the irradiation power to form recording marks having different sizes. The present invention is sufficiently enough if the irradiation of a laser beam can be eventually controlled. For example, the irradiation time or power of the laser beam may be controlled using a shutter that can modulate the transmission level of the laser beam.

In the aforementioned embodiment, the recording layer 12 is made of an organic dye such as cyanine. However, the present invention is not limited thereto, but may employ an organic dye other than those mentioned above or an inorganic dye, or other materials as appropriate. However, when the organic dye was used as mentioned above, it was possible to perform recording by positively varying the size of recording marks corresponding to the irradiation time of the laser beam in five stages or more, thereby making it possible to read each of the recording marks with a very high accuracy.

Furthermore, the size of the virtual recording cell 40 defined on the recording layer 12 upon forming recording marks with the aforementioned optical recording apparatus 30 is not limited to the example in the embodiment. Here, such a case has been shown in which the width of the virtual recording cell 40 is generally equal to the groove width W. However, for example, the width of the virtual recording cell 40 may be less than or equal to the width of the groove 16 as far as the beam waist of the laser beam can be further reduced in diameter. The same holds true for the length H. On the other hand, when recording marks are formed in more multi-stages such as in 8 stages, the size of the virtual recording cell 40 may be set to be greater than or equal to the laser beam waist. In this case, some of the recording marks can be made greater than or equal to the beam waist. Furthermore, the present invention can be applied to an optical recording medium having no groove 16.

Figure 11:
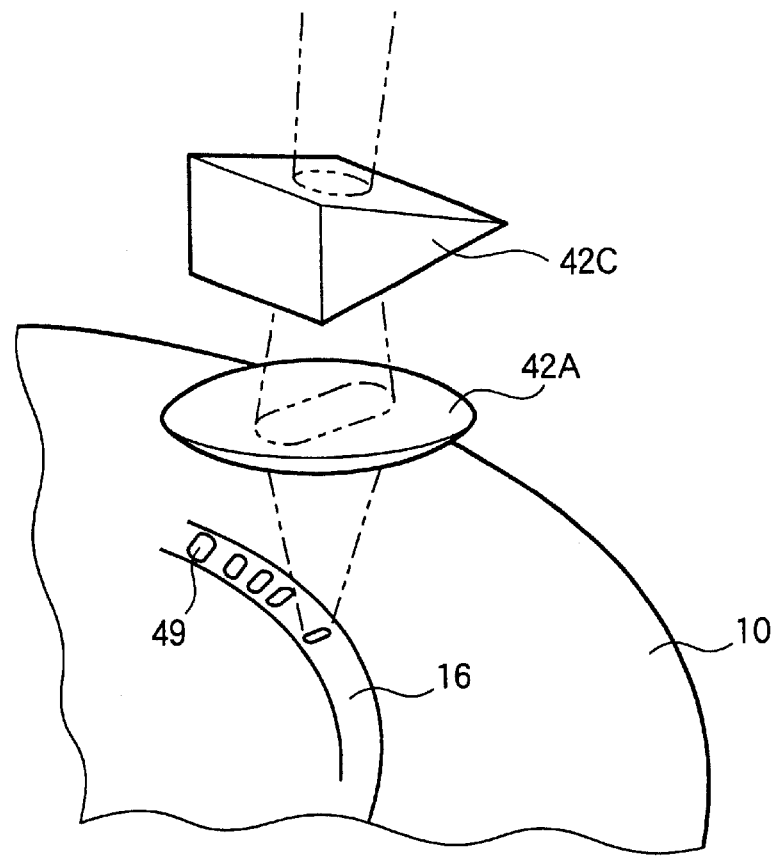
FIG. 11 is a schematic perspective view illustrating a case where a laser beam for irradiating a virtual recording cell therewith has another shape.

In addition, the laser beam is circular at the recording layer 12. However, as shown in FIG. 11, this may be changed, for example, by adding a beam shaping prism 42C or an aperture (not shown) or the like to the objective lens 42A, in a manner such that the beam shape is shorter in the feed direction of the recording medium 10 and elliptical or linear in the direction orthogonal thereto. In this case, since a recording marks 49 is made shorter, the virtual recording cell can be further made shorter. In other words, the recording density can be improved.

Furthermore, as indicated by reference numeral 52 in FIG. 1, the optical recording medium 10 may be provided in advance with a plurality of pits each having a different reflectivity, the number of which is equal to the number of stages of signal modulation. Alternatively, a multi-level recording according the optical recording method of the present invention may be performed partially on the optical recording medium. On the plurality of pits 52 and/or the recording marks 54 that have been recorded in multi-levels, it is acceptable to record identifying information such as the information for individually identifying the optical recording medium, the information for distinguishing whether an optical recording medium is adapted for multi-level recording, the information for determining the recommended recording power of a laser beam for recording and reading the optical recording medium, the information for determining the irradiation time of a laser beam, and the information on the width W of grooves. The identifying information is read upon reading and/or recording the optical recording medium. This makes it possible to distinguish positively whether the optical recording medium is adapted for multi-level recording, identify the optical recording media individually, and determine the irradiation time of a laser beam according to the number of stages of pits that have been recorded in advance. This thereby makes it possible to perform more positively recording and reading in multi-levels.

Alternatively, as indicated by reference numeral 56 in FIG. 1, the same effect can be obtained by providing a groove interrupting portion for interrupting part of a groove for guiding a laser beam. These methods can be used alone or in combination.

Normally, a recording medium for a CD-RW and a DVD-R/RW records a signal by wobbling a recording groove. This signal is referred to as an address signal. To read this signal enables a recording device to move a recording head to a predetermined position.

For example, in the case of a CD-R/RW, a time code of a minute and a second, whereby a position is replaced with a time, is recorded in this address signal. The recording device reads this time code and moves the head to a read-in portion, so that the recording device becomes possible to read various data.

A multi-level optical recording medium according to the present invention is capable of adopting an address signal by wobbling in the case that this multi-level optical recording medium is used (i.e., recorded or reproduced) in a recording device to be applied to a CD-R/RW. However, in this case, a signal system such as an address code or the like, which is different from a normal time code of a CD-R/RW, is adopted. A normal recording device is not capable of reading a peculiar address signal, which is different from that of the CD-R/RW, and is not capable of moving a head to a predetermined position (in this case, the multi-level optical recording medium is discharged from the recording device).

On the other hand, a recording device in association with multi-level recording becomes possible to read a signal by moving the head to the read-in portion, if the peculiar address is set to be capable of being identified.

In other words, it is possible to distinguish a multi-level optical recording medium from other optical recording medium by adopting an address, which is different from a normal address.

For example, as shown in FIG. 12, the recording by the use of the above described wobble is performed by modulating the wobble in grooves 104A to 104C in a read-in area 102 of an optical recording medium 10.

Figure 13:
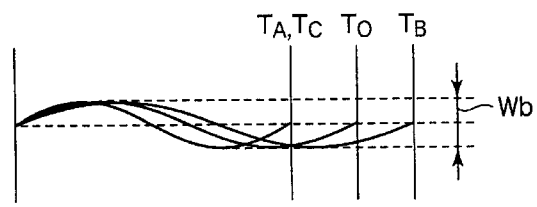
FIG. 13 is a diagram illustrating the relationship between wobble frequencies of the wobble and binary information.

Specifically, as shown in FIG. 13, without changing amplitude Wb of the wobble, wobble frequencies $T_A$, $T_B$ and $T_C$ of respective grooves are changed. For example, a wobble frequency $T_o$ of a groove 16 in a user area 106 shown in FIG. 12 is defined as a reference frequency and a wobble frequency $T_B$, which is longer than this reference frequency $T_0$, is mounted on a two-level signal indicating "1" and wobble frequencies $T_A$ and $T_C$, which are shorter than the reference frequency $T_0$, are mounted on a two-level signal indicating "0", so that the above described various information are recorded. Accordingly, for example, when the wobble frequencies are defined as "0", "1" and "0" counted from the inner periphery of the optical recording medium, it is indicated that this optical recording medium 10 is set to be used for the multi-level recording.

Alternatively, the above described predetermined information is defined as recording start position information and then, on the basis of this information, the recording of the information is set to be started from a predetermined position of the user area 106. This information also becomes the information of a starting position of a virtual recording cell 40.

Figure 14:
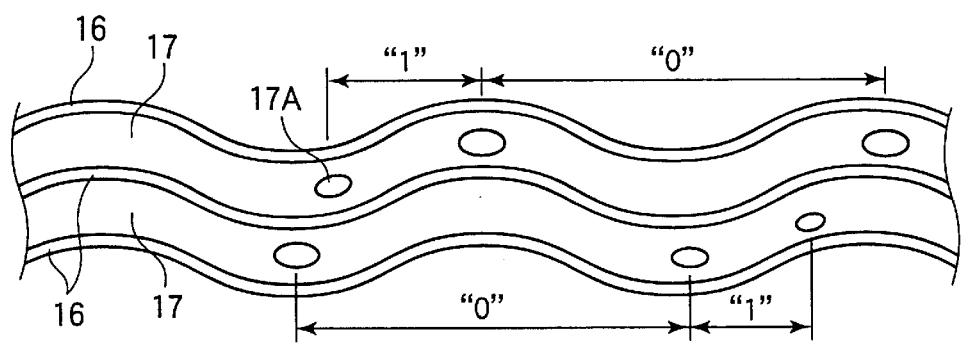
FIG. 14 is a schematic view illustrating the relationship between a binary information and a land pre-pit on which various information are recorded on the optical recording medium of the present invention.

Alternatively, according to other example of a recording method of the above described various information as shown in FIG. 14, the above described various information are mounted on a land pre-pit 17A, which has been formed in a land 17 between respective grooves 16, and then, for example, in the case that a frequency between the land pre-pits is short, the optical recording medium 10 binary records the information as "1" and in the case that a frequency between the land pre-pits is long, the optical recording medium 10 binary records the information as "0".

Figure 15:
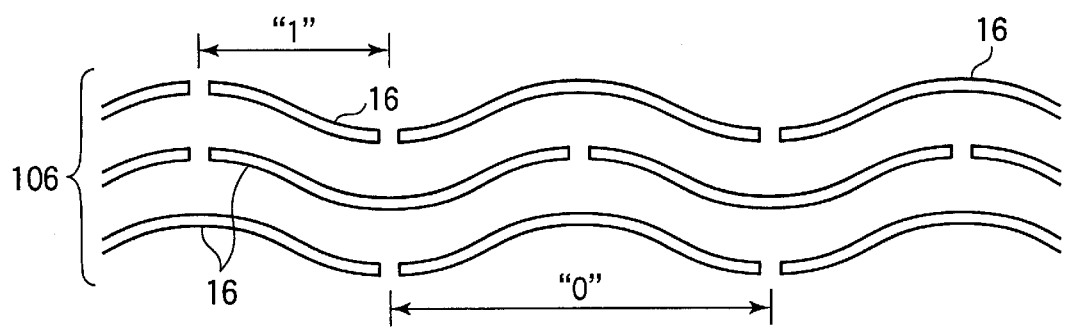
FIG. 15 is a schematic view illustrating the relationship between a binary information and a ceased length of the groove on which various information are recorded on the optical recording medium of the present invention.

Further, according to other example as shown in FIG. 15 or FIG. 1 (indicated by reference numeral 56), the grooves 16 are ceased and then, for example, in the case that a ceased length of the groove is short, the optical recording medium 10 is controlled to indicate "1" and for example, in the case that it is long, the optical recording medium 10 is controlled to indicate "0".

By enabling the information recorded by the information recording means shown in the above described FIGS. 12, 14 and 15 also to be capable of being read by even a reading device of a conventional binary recording type, even if this multi-level optical recording medium is loaded in a reading and/or recording device of a binary recording type by mistake, this multi-level optical recording medium is easily identified as a multi-level type recording medium.

Figure 16:
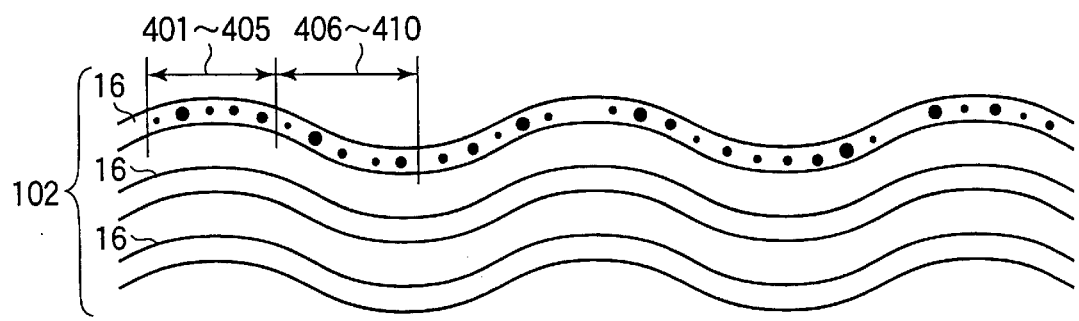
FIG. 16 is a schematic view illustrating the virtual recording cells and the recording marks on which various information are recorded on the optical recording medium of the present invention.
Figure 17:
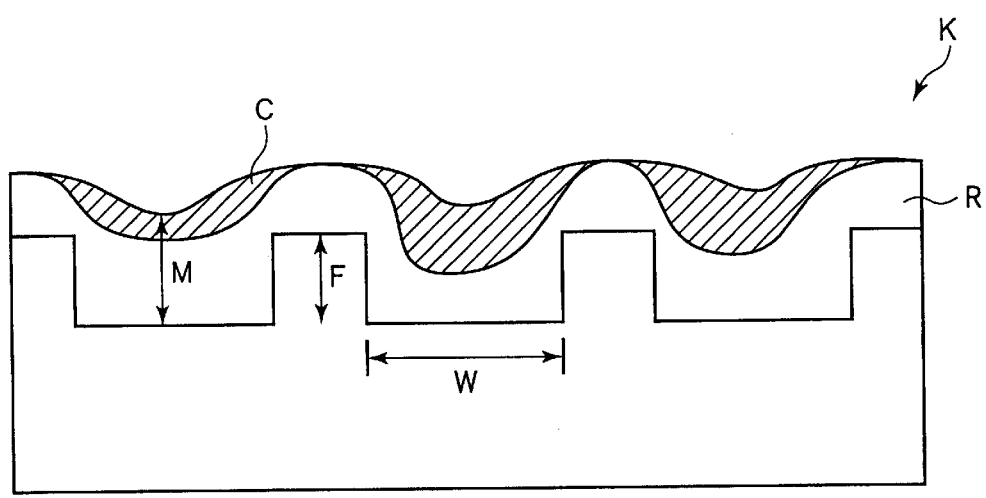
FIG. 17 is an enlarged cross-sectional view illustrating the configuration of the vicinity of grooves of a conventional optical recording medium.

Further, for example, as shown in FIG. 16 or FIG. 1 (indicated by reference numeral 54), it is possible to multi-level record the above described various information in the read-in area 102 in advance. In this case, in FIG. 16, it is possible to record the fact that this recording medium is a multi-level recording medium and the number of the stages of the multi-level recording by means of first five recording marks of virtual recording cells 401 to 405 and it is possible to record a recommended laser power for recording or reading or the like by means of next five virtual recording cells 406 to 410, respectively.

However, as indicated by reference numeral 55 in FIG. 1, other recording means such as recording marks made up of binary records or bar codes may be provided on a virtual recording cell or at a position other than the virtual recording cell in the optical recording medium.

The optical recording medium according to the present invention makes it possible to perform multi-level recording corresponding to the data to be recorded, and improve the characteristics of the read signal from the recording mark as well.

EXAMPLE

An example of the present invention is shown below in conjunction with a comparative example. The specific conditions of the example and comparative example are as follows.

An optical recording medium of a CD-R type having a recording layer made of a dye was prepared as the optical recording medium 10, on which an experiment on multi-level recording was carried out.

As shown in Table 2, the dynamic range was changed in a variety of ways by changing the width of grooves to be formed on the optical transparent substrate. The recording laser power was 13 mW, the depth of grooves was 200 nm, and the thickness of the dye with respect to the depth of the grooves was on the order of 70%.

TABLE 2

| | Groove Width (nm) | Dynamic Range (X–Y)/X | Error | SDR (%) | Judgment |
|---|---|---|---|---|---|
| Comparative Example 1 | 310 | 0.24 | 6.15 | 3.63 | ↓ Good |
| Example 1 | 350 | 0.31 | 4.28 | 1.86 | |
| Example 2 | 480 | 0.41 | 3.19 | 1.51 | |

In addition, as shown in Table 3, the dynamic range was changed in a variety of ways by changing the depth of grooves to be formed on the optical transparent substrate. The recording laser power was 13 mW, the depth of grooves was 350 nm, the thickness of the dye with respect to the depth of the grooves was on the order of 70%, and the recording linear velocity was 9.6 m/s.

TABLE 3

| | Groove depth (nm) | Dynamic Range (X–Y)/X | Error | SDR (%) | Judgment |
|---|---|---|---|---|---|
| Comparative Example 2 | 160 | 0.28 | 5.72 | 3.77 | ↓ Good |
| Example 3 | 180 | 0.32 | 3.68 | 1.79 | |
| Example 4 | 200 | 0.41 | 2.57 | 1.55 | |

Here, the groove depth was determined from the highest position of a land present between grooves and the lowest position of the bottom portion of the groove. In addition, the groove width was measured at the position of half the depth of the groove. Furthermore, the thickness of the dye was measured by cutting the optical recording medium in the radial direction of the disc and then observing the cross-sectional view of the groove and land with a scanning electron microscope.

The recording and reading apparatus employed a general-purpose drive for use with a CD-R/RW, while the dynamic range was measured and determined with the reflectivity that was measured using a digital oscilloscope by Hewlett Packard.

In addition, the error in Table 2 and Table 3 means an measure for checking whether a recorded signal can be read properly, and signals obtained by the digital oscilloscope by Hewlett Packard were captured into a computer to calculate the error values. These values or inventor's own measures of 5.00 or less allow for determining that recording and reading have been properly performed. Those above the value cause recording and reading to become extremely unstable, presenting a problem of exerting a harmful effect on recording and reading.

In the multi-level recording according to the present invention, as the aforementioned results, dynamic ranges of 0.3 or more, preferably 0.4 or more, make it possible to perform recording and reading with less errors and reduce jitter values as well. Furthermore, it is possible to simultaneously obtain good reflectivity and push-pull signals.

The present invention can be applied to a technique for new multi-level recording in five stages or more, making it possible to provide an optical recording medium that allows for detecting data positively. In addition to this, it is also made possible to contain recording marks having a length less than or equal to the diameter (the beam waist) of a reading converging laser beam, thereby allowing for dramatically increasing the recording density of information.

What is claimed is:

1. An optical recording medium in which on an optical transparent substrate having predetermined grooves, a recording layer is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that $0.20 \times (\lambda/NA) < W < 0.50 \times (\lambda/NA)$, where $\lambda$ (nm) is the wavelength of the laser beam and NA is the numerical aperture of the objective lens for the laser beam in a irradiation optical system; at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

2. The optical recording medium according to claim 1, wherein the groove width W is set so that $0.25\times(\lambda/NA)<W<0.45\times(\lambda/NA)$.

3. The optical recording medium according to claim 1, wherein a plurality of the grooves are formed generally parallel to each other, and the pitch P between the grooves adjacent to each other is set so that $0.65\times(\lambda/NA)<P$, more preferably $0.7\times(\lambda/NA)<P<1.2\times(\lambda/NA)$.

4. The optical recording medium according to claim 1, wherein the recording layer is adapted to contain an organic dye.

5. The optical recording medium according to claim 1, wherein the recording layer is adapted to contain a cyanine base dye.

6. An optical recording medium in which on an optical transparent substrate having predetermined grooves, a recording layer mainly including phthalocyanine dye is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that $0.25\times(\lambda/NA)<W<0.55\times(\lambda/NA)$, where $\lambda$ (nm) is the wavelength of the laser beam and NA is the numerical aperture of the objective lens for the laser beam in a irradiation optical system; at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

7. The optical recording medium according to claim 6, wherein the groove width W is set so that $0.30\times(\lambda/NA)<W<0.50\times(\lambda/NA)$.

8. The optical recording medium according to claim 6, wherein a plurality of the grooves are formed generally parallel to each other, and the pitch P between the grooves adjacent to each other is set so that $0.65\times(\lambda/NA)<P$, more preferably $0.7\times(\lambda/NA)<P<1.2\times(\lambda/NA)$.

9. An optical recording medium with an optical transparent substrate having predetermined grooves and a recording layer formed at least to cover the grooves, the recording layer being irradiated with a laser beam to form recording marks and record information at least on the recording layer, the optical recording medium wherein
on the recording layer, virtual recording cells are contiguously defined along a feed direction of the laser irradiation for performing recording and reading operations on the groove, the virtual recording cell having a given unit length in the feed direction and a given unit width in a direction perpendicular thereto,
a minimum thickness of the recording layer with respect to a bottom surface of the groove is set to be smaller than a depth of the groove on the optical transparent substrate, and
at least either an irradiation time or an irradiation power is set in five stages or more to irradiate the virtual recording cell with the laser beam, thereby allowing for forming recording marks having different sizes of five types or more on the virtual recording cell, and an entire optical reflectivity of the virtual recording cell is modulated based on an area ratio of the recording mark to the virtual recording cell, thereby allowing for recording information in multi-levels.

10. The optical recording medium according to claim 9, wherein
the minimum film thickness M of the recording layer with respect to the bottom surface of the groove is set in terms of the groove depth F on the optical transparent substrate, so that $0.2\times F<M<1.0\times F$.

11. The optical recording medium according to claim 9, wherein
the minimum thickness M of the recording layer with respect to the bottom surface of the groove is set in terms of the groove depth F on the optical transparent substrate, so that $0.3\times F<M<0.8\times F$.

12. The optical recording medium according to claim 9, wherein
the minimum thickness M of the recording layer with respect to the bottom surface of the groove is set in terms of the groove depth F on the optical transparent substrate, so that $0.4\times F<M<0.6\times F$.

13. The optical recording medium according to claim 9, wherein
the recording layer contains an organic dye.

14. The optical recording medium according to claim 13, wherein
the organic dye contained in the recording layer comprises a cyanine base dye.

15. An optical recording medium with a recording layer formed on an optical transparent substrate and irradiated with a laser beam to form recording marks and record information on the recording layer, wherein
within a recording mark formation region on the optical recording medium, a plurality of virtual recording cells are contiguously defined in a direction of movement relative to the laser beam, the virtual recording cell having a predetermined unit length and a predetermined unit width in a direction perpendicular thereto,
a characteristic of the virtual recording cell is set so that (X−Y)/X is 0.3 or more, preferably 0.4 or more, where X(%) is an initial reflectivity of the virtual recording cell without being irradiated with the laser beam and Y(%) is a minimum reflectivity limit for a maximum recording mark formed by being irradiated with the laser beam, and
at least either an irradiation time or an irradiation power of the laser beam is modulated in five stages or more to irradiate the virtual recording cell with the laser beam, thereby allowing for multi-level recording.

16. The optical recording medium according to claim 15, wherein
when the recording marks are formed by switching at least either the irradiation time or the irradiation power of the laser beam in five stages or more to perform multi-level recording, the characteristic of the virtual recording cell is set so that a variation in reflectivity of all recording mark formation regions at each stage falls within 5%, preferably within 3%.

17. The optical recording medium according to claim 1, wherein
the characteristic of the virtual recording cell is set so that $(X-Y)/X \leq 0.9$.

18. An optical recording method for an optical recording medium with a recording layer formed on an optical transparent substrate and irradiated with a laser beam to form recording marks and record information on the recording layer, wherein
    within a recording mark formation region on the optical recording medium, a plurality of virtual recording cells are contiguously defined in a direction of movement relative to the laser beam, the virtual recording cells having a predetermined unit length and a predetermined unit width in a direction perpendicular thereto,
    a characteristic of the virtual recording cell is set so that $(X-Y)/X$ is 0.3 or more, preferably 0.4 or more, where $X(\%)$ is an initial reflectivity of the virtual recording cell without being irradiated with the laser beam and $Y(\%)$ is a minimum reflectivity limit for a maximum recording mark formed by being irradiated with the laser beam, and
    at least either an irradiation time or an irradiation power of the laser beam is modulated in five stages or more to irradiate the virtual recording cell with the laser beam, thereby allowing for multi-level recording.

19. The optical recording method according to claim 18, wherein
    when the recording marks are formed by switching at least either the irradiation time or the irradiation power of the laser beam in five stages or more to perform multi-level recording, the characteristic of the virtual recording cell is set so that a variation in reflectivity of all recording mark formation regions at each stage falls within 5%, preferably within 3%.

20. The optical recording method according to claim 18, wherein
    the characteristic of the virtual recording cell is set so that $(X-Y)/X \leq 0.9$.

21. An optical recording medium in which on an optical transparent substrate having predetermined grooves, a recording layer is formed at least to cover the grooves and irradiated with a laser beam to form recording marks at least on the recording layer to thereby record information on the recording layer, the optical recording medium wherein on the recording layer, contiguously defined along a feed direction of the laser irradiation are virtual recording cells which have a given unit length in the feed direction along the groove and a given unit width in the direction orthogonal thereto; the groove width W is set so that $0.20\times(\lambda/NA)<W<0.50\times(\lambda/NA)$, where $\lambda$ (nm) is the wavelength of the laser beam and NA is the numerical aperture of the objective lens for the laser beam in a irradiation optical system; a minimum thickness of the recording layer with respect to a bottom surface of the groove is set to be smaller than a depth of the groove on the optical transparent substrate, at least either the irradiation time or irradiation power is set in five stages or more to radiate the virtual recording cell with the laser beam, thereby allowing for forming recording marks having different sizes of five types or more on the virtual recording cell; and optical reflectivity is modulated in accordance with the area ratio of the recording mark to the virtual recording cell, thereby allowing for recording information in multi-levels.

22. The optical recording medium according to claim 21, wherein a characteristic of the virtual recording cell is set so that $(X-Y)/X$ is 0.3 or more, preferably 0.4 or more, where $X(\%)$ is an initial reflectivity of the virtual recording cell without being irradiated with the laser beam and $Y(\%)$ is a minimum reflectivity limit for a maximum recording mark formed by being irradiated with the laser beam.

23. An optical recording medium with an optical transparent substrate having predetermined grooves and a recording layer formed at least to cover the grooves, the recording layer being irradiated with a laser beam to form recording marks and record information at least on the recording layer, the optical recording medium wherein
    on the recording layer, virtual recording cells are contiguously defined along a feed direction of the laser irradiation for performing recording and reading operations on the groove, the virtual recording cell having a given unit length in the feed direction and a given unit width in a direction perpendicular thereto,
    a minimum thickness of the recording layer with respect to a bottom surface of the groove is set to be smaller than a depth of the groove on the optical transparent substrate,
    a characteristic of the virtual recording cell is set so that $(X-Y)/X$ is 0.3 or more, preferably 0.4 or more, where $X(\%)$ is an initial reflectivity of the virtual recording cell without being irradiated with the laser beam and $Y(\%)$ is a minimum reflectivity limit for a maximum recording mark formed by being irradiated with the laser beam, and
    at least either an irradiation time or an irradiation power is set in five stages or more to irradiate the virtual recording cell with the laser beam, thereby allowing for forming recording marks having different sizes of five types or more on the virtual recording cell, and an entire optical reflectivity of the virtual recording cell is modulated based on an area ratio of the recording mark to the virtual recording cell, thereby allowing for recording information in multi-levels.

24. An optical recording method for an optical recording medium with a recording layer formed on an optical transparent substrate and irradiated with a laser beam to form recording marks and record information on the recording layer, wherein
    within a recording mark formation region on the optical recording medium, a plurality of virtual recording cells are contiguously defined in a direction of movement relative to the laser beam, the virtual recording cells having a predetermined unit length and a predetermined unit width in a direction perpendicular thereto,
    a characteristic of the virtual recording cell is set so that $(X-Y)/X$ is 0.3 or more, preferably 0.4 or more, where $X(\%)$ is an initial reflectivity of the virtual recording cell without being irradiated with the laser beam and $Y(\%)$ is a minimum reflectivity limit for a maximum recording mark formed by being irradiated with the laser beam,
    the groove width W is set so that $0.20\times(\lambda/NA)<W<0.50\times(\lambda/NA)$, where $\lambda$ (nm) is the wavelength of the laser beam and NA is the numerical aperture of the objective lens for the laser beam in a irradiation optical system, and
    at least either an irradiation time or an irradiation power of the laser beam is modulated in five stages or more to irradiate the virtual recording cell with the laser beam, thereby allowing for multi-level recording.

25. The optical recording method according to claim 24, wherein a minimum thickness of the recording layer with respect to a bottom surface of the groove is set to be smaller than a depth of the groove on the optical transparent substrate.

* * * * *